(12) United States Patent
Ota et al.

(10) Patent No.: US 9,230,586 B1
(45) Date of Patent: Jan. 5, 2016

(54) METHOD OF SETTING FLYING HEIGHT AND FLYING HEIGHT SETTING DEVICE

(71) Applicant: TDK Corporation, Tokyo (JP)

(72) Inventors: Norikazu Ota, Tokyo (JP); Osamu Nakada, Tokyo (JP); Mitsuo Otsuki, Tokyo (JP); Shinji Hara, Tokyo (JP); Daisuke Miyauchi, Tokyo (JP); Tetsuya Roppongi, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 3 days.

(21) Appl. No.: 14/335,984

(22) Filed: Jul. 21, 2014

(51) Int. Cl.
*G11B 5/52* (2006.01)
*G11B 5/60* (2006.01)
*G11B 5/00* (2006.01)

(52) U.S. Cl.
CPC .............. *G11B 5/607* (2013.01); *G11B 5/6011* (2013.01); *G11B 5/6029* (2013.01); *G11B 5/6052* (2013.01); *G11B 5/6076* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 8,395,974 B1 * | 3/2013 | Shimazawa | .......... | G11B 5/3133 369/112.27 |
| 2008/0239581 A1 * | 10/2008 | Ikai | ...................... | G11B 5/3136 360/272 |
| 2010/0103553 A1 | 4/2010 | Shimazawa et al. | | |
| 2011/0157736 A1 | 6/2011 | Contreras et al. | | |
| 2013/0148230 A1 | 6/2013 | Jin et al. | | |
| 2013/0294207 A1 * | 11/2013 | Erden | ....................... | G11B 5/02 369/13.11 |
| 2013/0335843 A1 | 12/2013 | Santoso et al. | | |
| 2014/0368946 A1 * | 12/2014 | Chou | ...................... | G11B 5/607 360/66 |
| 2015/0036469 A1 * | 2/2015 | Johnson | ................... | G11B 5/02 369/13.33 |

FOREIGN PATENT DOCUMENTS

| | | |
|---|---|---|
| JP | H10-162444 A | 6/1998 |
| JP | 2004-158067 A | 6/2004 |
| JP | 2009-059417 A | 3/2009 |
| JP | 2009-259359 A | 11/2009 |
| JP | 2010-079978 A | 4/2010 |
| JP | 2011-255254 A | 12/2011 |
| JP | 2012-053973 A | 3/2012 |

* cited by examiner

*Primary Examiner* — Dionne Pendleton
(74) *Attorney, Agent, or Firm* — Posz Law Group, PLC

(57) ABSTRACT

While a plurality of drive currents for flying height setting with current values smaller than a tentative optimum drive current are supplied to a light source, respectively, heater power is supplied to a heater part, and touch down of a thermally-assisted magnetic recording head is detected. Tentative optimum heater power is determined based on a correlation between the heater power when the touch down is detected and each drive current for flying height setting. The tentative optimum drive current is supplied to the light source part; the tentative optimum heater power is supplied to the heater part; a reference signal is recorded in a magnetic recording medium; and flying height of the thermally-assisted magnetic recording head is set by determining whether or not the reference signal is recorded with the desired signal intensity.

7 Claims, 8 Drawing Sheets

METHOD OF SETTING FLYING HEIGHT AND FLYING HEIGHT SETTING DEVICE

FIELD OF THE INVENTION

The present invention relates to a method for setting the flying height of a thermally-assisted magnetic recording head, and a device for setting the flying height in a magnetic recording device including a thermally-assisted magnetic recording head that irradiates near-field light to a magnetic recording medium, and that decreases the anisotropy field of the magnetic recording medium to record data.

BACKGROUND OF THE INVENTION

In the field of magnetic recording using a head and a medium, further performance improvement of thin film magnetic heads and magnetic recording media is in demand in association with the high recording density of magnetic disc devices. As a thin film magnetic head, at present, a composite type thin film magnetic head made of a structure where a magnetoresistant (MR) element for reading and an electromagnetic transducer element for writing are laminated is widely used.

The magnetic recording medium is a discontinuous medium in which magnetic grains are aggregated, and each magnetic grain has a single magnetic domain structure. In the magnetic recording medium, one recording bit is configured by a plurality of magnetic grains. Consequently, in order to enhance the recording density, asperities at the border between adjacent recording bits need to be reduced by decreasing the size of the magnetic grains. However, if the magnetic grains are reduced in size, there is the problem that the thermal stability of magnetization of the magnetic grains is reduced in association with a decrease in the volume of the magnetic grain.

As a countermeasure against this problem, an increase of magneto anisotropy energy Ku of magnetic grains may be considered; however, the increase of Ku results in an increase in an anisotropy field (coercive force) of a magnetic recording medium. On the other hand, the upper limit of the recording magnetic field intensity of the thin film magnetic head is substantially determined by saturation magnetic flux density of a soft magnetic material configuring a magnetic core within the head. Consequently, if the anisotropy field of the magnetic recording medium exceeds the acceptable value determined by the upper limit of the recording magnetic field intensity, it becomes impossible to write to the magnetic recording medium. Currently, as a method to solve such a thermal stability problem, a so-called thermally assisted magnetic recording method is proposed in which a recording magnetic field is applied to record information under a state where the anisotropy field is reduced by heating the magnetic recording medium while a magnetic recording medium made from a magnetic material with large Ku is used.

In this thermally assisted magnetic recording method, a method using a near-field light probe, or so-called plasmon-generator, comprising a metal piece that generates NF light from plasmon excited by laser light is generally known, and as a magnetic head including such a plasmon-generator, a magnetic head including a magnetic pole, a waveguide and a plasmon-generator facing the waveguide is proposed.

In a thermally-assisted magnetic recording head, light propagated through the waveguide is coupled with a plasmon-generator in a surface plasmon mode, and excites the surface plasmon. Propagation of such surface plasmon in the plasmon-generator causes the generation of near-field light at the near-field light generating portion positioned at the end portion of the plasmon-generator at the medium opposed surface side. Then, a magnetic recording medium is heated by irradiating the magnetic recording medium with the near-field light generated at the near-field light generating portion of the plasmon-generator, and information is recorded by applying a magnetic field under a state where the anisotropy field of the magnetic recording field is decreased.

In a thermally-assisted magnetic disk device including such a thermally-assisted magnetic recording head, the distance between the thermally-assisted magnetic recording head and the magnetic recording medium, i.e., the flying height of the thermally-assisted magnetic recording head relative to the magnetic recording medium, is an important parameter to satisfy demands, such as reduction of the bit error rate (BER) or high recording density.

Recently, in order to respond to demands, such as high recording density, a technology is proposed in which a medium opposed surface of the thermally-assisted magnetic recording head toward the magnetic recording medium side is protruded by heat-expanding the surface due to the heat generation of a heater and the like, and the flying height of the thermally-assisted magnetic recording head relative to the magnetic recording medium is reduced (see for example, JP 2010-79978). In the patent literature (JP 2010-79978), it is disclosed that the protrusion amount of the medium opposed surface is controlled by controlling the power supply to the heater, and the optimum flying height (the target flying height) can be realized. However, in a thermally-assisted magnetic disk device, in addition to the protrusion of the medium opposed surface due to supply of power to the heater and the application of writing current, since the medium opposed surface also protrudes due to the generation of near-field light, it is actually difficult to reduce the target flying height to approximately several nm (approximately 2 nm).

In the technology disclosed in the patent literature, the supply of power to the heater that can accomplish the target flying height can be set by a touch down test of the thermally-assisted magnetic recording head. In other words, the medium opposed surface gradually protrudes while the supply of power to the heater is increased, contact (touch down) between the thermally-assisted magnetic recording head and the magnetic recording medium is detected, and the supply of power to the heater that can accomplish the target flying height is determined.

In the meantime, in a thermally-assisted magnetic recording head, when a signal is recorded, the near-field light generated at the plasmon-generator is irradiated to the magnetic recording medium. In association with the generation of the near-field light, the vicinity of the medium opposed surface of the thermally-assisted magnetic recording head is heated, and the medium opposed surface protrudes toward the magnetic recording medium side. Therefore, taking into consideration the protrusion of the medium opposed surface of the thermally-assisted magnetic recording head due to the near-field light, it is necessary to set a supply of power to the heater that can accomplish the target flying height.

SUMMARY OF THE INVENTION

It is an object of the present invention to provide a method and device for setting the flying height of the thermally-assisted magnetic head, in a thermally-assisted magnetic recording device having a thermally-assisted magnetic recording head that take into consideration protrusion of a medium opposite surface of the thermally-assisted magnetic head due to heat generation by light for heating a magnetic disk.

In order to accomplish this objective, the present invention provides a method for setting a flying height of a thermally-assisted magnetic recording head relative to a magnetic recording medium in a thermally-assisted magnetic recording device, including: a magnetic recording medium, a thermally-assisted magnetic recording head, and a positioning device that supports the thermally-assisted magnetic recording head, and that positions the thermally-assisted magnetic recording head relative to the magnetic recording medium, wherein the thermally-assisted magnetic recording head includes: a magnetic pole that generates a writing magnetic field from an end surface that forms a portion of a medium opposed surface facing the magnetic recording medium, a waveguide where light for exciting surface plasmon propagates, a plasmon-generator that generates near-field light from a near-field light generating portion on a near-field light generating end surface that forms a portion of the medium opposed surface by coupling with the light in the surface plasmon mode, a light source part that irradiates the waveguide with light by applying a predetermined drive current, and a heater part that heats the vicinity of the medium opposed surface in order to protrude the medium opposed surface toward the magnetic recording medium side, wherein the setting method comprising the steps of: determining a tentative optimum drive current that is supplied to the light source part, and setting 1st to nth drive currents for flying height setting (n is an integer of 2 or more) where values are smaller than the tentative optimum drive current, and increase sequentially; supplying heater power to the heater part while supplying the 1st to nth drive currents for flying height setting to the light source part to protrude the medium opposed surface of the thermally-assisted magnetic recording head toward the magnetic recording medium side, and detecting touch down of the thermally-assisted magnetic recording head; storing the heater power that is supplied to the heater part when the touch down of the thermally-assisted magnetic recording head is detected as touch down power; calculating a correlation between the 1st to nth drive currents for flying height setting and the touch down power, determining a tentative optimum heater power to be supplied to the heater when the tentative optimum drive current is supplied to the light source part so as to set the flying height to be a target flying height; supplying the tentative optimum drive current to the light source part, supplying the tentative heater power to the heater part, and recording a reference signal on the magnetic recording medium; and determining whether or not the reference signal is recorded with a the desired signal intensity, wherein if it is determined that the reference signal is not recorded with the desired signal intensity, while the current values of the tentative optimum drive current and the 1st to nth drive currents for flying height setting are changed to greater current values, a series of steps from the step of detecting the touch down to the step of determination are repeated until the reference signal is recorded at the desired signal intensity, and when it is determined that the reference signal is recorded with the desired signal intensity, the tentative optimum drive current at that time and tentative heater power determined based on the correlation are determined as the optimum drive current to be supplied to the light source part and the optimum heater power to be supplied to the heater part, respectively (Invention 1).

The vicinity of a medium opposed surface is heated by near-field light that is irradiated from the near-field light generating portion of the thermally-assisted magnetic recording head to a magnetic recording medium, and the medium opposed surface protrudes toward the magnetic recording medium side. It has become ascertained according to keen study by the inventors that the spot diameter of the near-field light may become smaller responding to demand of high recording density in recent years, and that the protrusion shape of the medium opposed surface attributable to heat in association with generation of the near-field light becomes precipitous. If the protrusion shape of the medium opposed surface of the thermally-assisted magnetic recording head is precipitous, the contact area with the magnetic recording medium in the thermally-assisted magnetic recording head becomes extremely small, so it may become difficult to precisely detect touch down relative to the magnetic recording medium of the thermally-assisted magnetic recording head can occur. If it becomes difficult to detect touch down, as a result of pushing the thermally-assisted magnetic recording head into the magnetic recording medium so as to make touch down detectable, the thermally-assisted magnetic recording head and the magnetic recording medium may be damaged. In the invention (Invention 1), touch down relative to the magnetic recording medium of the thermally-assisted magnetic recording head can be assuredly detected by touching down the thermally-assisted magnetic recording head while near-field light is generated by a drive current for setting the flying height, which is smaller than the drive current supplied to the light source to be a source for generating the near-field light. Therefore, optimum heater power that is supplied to the heater part and optimum drive current supplied to the light source in order to accomplish target flying height can be determined without causing damage to the magnetic recording medium and the thermally-assisted magnetic recording head. As a result, the flying height of the thermally-assisted magnetic recording head can be set to the target flying height.

In the invention above (Invention 1), current values of the 1st to nth drive currents for flying height setting can all be set to 70% or less of the current value of the tentative optimum drive current (Invention 2) or preferably 60% or less (Invention 3).

Further, in the above invention (Invention 1), the current values of the 1st to nth drive currents for flying height setting can be set within the range of 30% to 70% of the current value of the tentative optimum drive current (Invention 4), or preferably within the range of 30% to 60% (Invention 5).

In the above invention (Invention 1), the thermally-assisted magnetic head further includes a writing coil for generating a writing magnetic field in the magnetic pole, and it is preferable to conduct the step of detecting touch down under a state where write current is supplied to the writing coil (Invention 6).

Further, the present invention provides a device for setting a flying height of a thermally-assisted magnetic recording head relative to a magnetic recording medium in a thermally-assisted magnetic recording device, including: the magnetic recording medium, the thermally-assisted magnetic recording head, and a positioning device that supports the thermally-assisted magnetic recording head, and that positions the thermally-assisted magnetic recording head relative to the magnetic recording medium, wherein the thermally-assisted magnetic recording head includes: a magnetic pole that generates a writing magnetic field from an end surface that forms a portion of a medium opposed surface facing the magnetic recording medium, a waveguide where light for exciting surface plasmon propagates, a plasmon-generator that generates near-field light from a near-field light generating portion on a near-field light generating end surface that forms a portion of the medium opposed surface by coupling with the light in a surface plasmon mode, a light source that irradiates the waveguide with light by applying a predetermined drive current, and a heater part that heats the vicinity of the medium opposed surface in order to protrude the medium opposed surface toward the magnetic recording medium side, wherein the flying height setting device includes: a drive current determination part that determines a tentative optimum drive current that is supplied to the light source part, and that determines 1st to nth drive currents for flying height setting (n being an integer of 2 or more) where values of the drive currents are smaller than the tentative optimum drive current, and increase sequentially, a touch down detection part that detects touch down of the thermally-assisted magnetic recording medium; a storage part that stores the heater power, which is supplied to the heater part when the touch down of the thermally-assisted magnetic recording head is detected by the touch down detection part; a correlation calculation part that calculates correlation between the 1st to nth drive currents for flying height setting and the touch down power; a tentative optimum heater power determination part that determines tentative optimum heater power to be supplied to the heater part when the tentative optimum drive current is supplied to the light source part based on the correlation, so as to set the flying height as a target flying height; and a determination part that supplies the tentative optimum drive current to the light source part, and that supplies the optimum heater power to the heater part, and that determines whether or not a reference signal recorded in the magnetic recording medium is recorded with a desired signal intensity (Invention 7).

According to the present invention, a method for setting flying height of the thermally-assisted magnetic recording head and a device for setting the flying height can be provided in the thermally-assisted magnetic recording device having a thermally-assisted magnetic recording head considering protrusion of a medium opposed surface of the thermally-assisted magnetic recording head due to heat generation by a light for heating the magnetic disk.

DETAILED DESCRIPTION OF THE INVENTION

Before explaining an embodiment of the present invention, terms used herein are defined. In a laminated structure or an element structure formed on an element formation surface of a slider substrate of the thermally-assisted magnetic recording head relating to one embodiment of the present invention, a substrate side is regarded as "downward" and its opposite side is regarded as "upward", viewed from a layer or an element that is a reference. Further, the medium opposed surface side is regarded as "forward" and its opposite side is regarded as "back side" or "backward" viewed from a layer or an element that is a reference. In addition, in the magnetic recording head relating to one embodiment of the present invention, as needed, in some drawings, "X, Y and Z-axis directions" are referenced. Herein, the Z-axis direction is "vertical direction" as mentioned above, and +Z side is equivalent to a trailing side, and −Z side is equivalent to a leading side. Further, the Y-axis direction is the track width direction, and the X-axis direction is the height direction.

When explaining the flying height setting method of the thermally-assisted magnetic recording head in the thermally-assisted magnetic recording device relating to one embodiment of the present invention, a thermally-assisted magnetic disk device having a thermally-assisted magnetic recording head as the subject of setting the flying height is explained.

<Thermally-Assisted Magnetic Disk Device>

Figure 1:
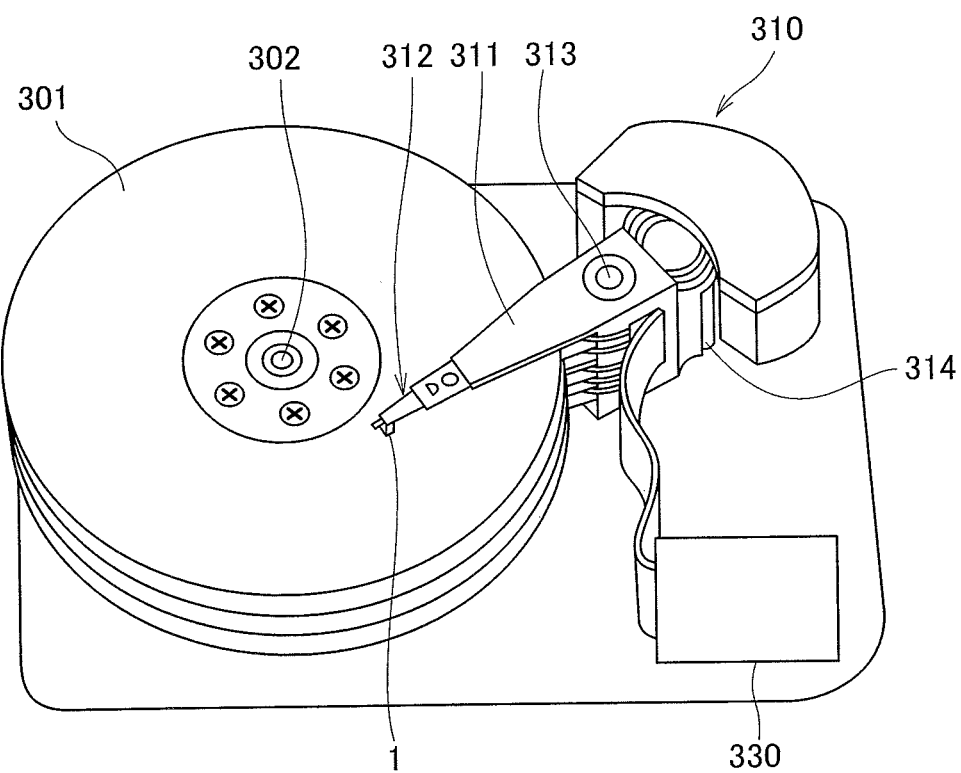
FIG. 1 is a perspective view schematically showing a magnetic recording device in one embodiment of the present invention.
Figure 2:
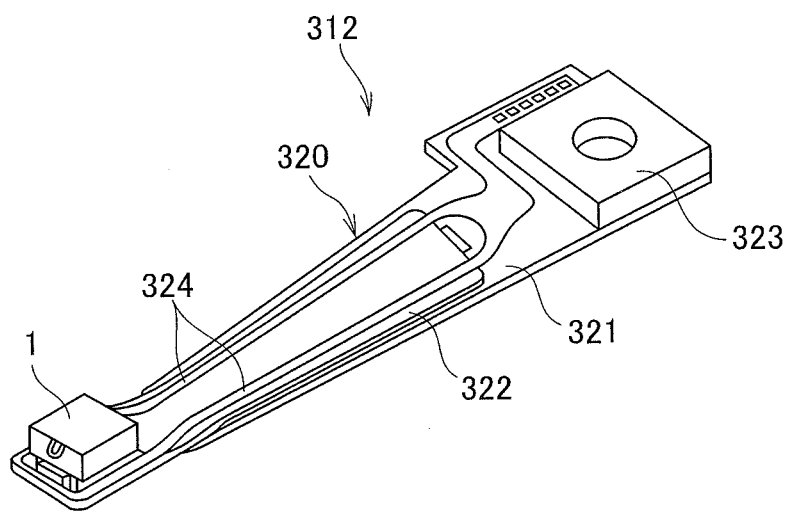
FIG. 2 is a perspective view schematically showing a head gimbal assembly (HGA) in one embodiment of the present invention.
Figure 3:
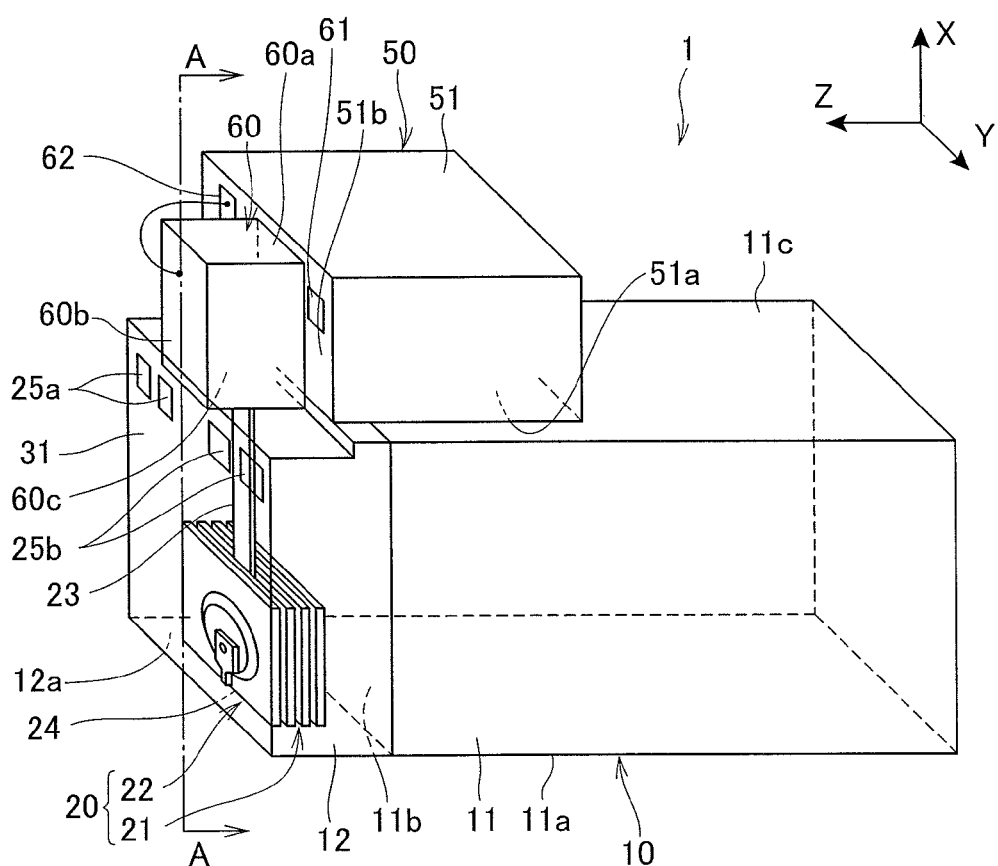
FIG. 3 is a perspective view showing a thermally-assisted magnetic recording head relating to one embodiment of the present invention.

FIG. 1 is a perspective view schematically showing a magnetic recording device in the present embodiment, FIG. 2 is a perspective view schematically showing a head gimbal assembly (HGA) in the present embodiment, and FIG. 3 is a perspective view showing the thermally-assisted magnetic recording head in the present embodiment.

As shown in FIG. 1, a magnetic disk device as a magnetic recording device in the present embodiment includes a plurality of magnetic disks 301 that rotate around a rotation shaft of a spindle motor 302, an assembly carriage device 310 where a plurality of drive arms 311 are provided, a head gimbal assembly (HGA) 312 attached to a front end part of each drive arm 311 and having a thermally-assisted magnetic recording head 1 relating to the present embodiment, which is a thin film magnetic head, and a control circuit 330 for controlling writing/reading operation of the thermally-assisted magnetic recording head 1 relating to the present embodiment, and for controlling light emission operation of a laser diode, which is a light source that generates laser light for thermally-assisted magnetic recording described later.

In the present embodiment, the magnetic disk 301 is for perpendicular magnetic recording, and has a structure where a soft magnetic under layer, an intermediate layer and a magnetic recording layer (perpendicular magnetization layer) are sequentially laminated on a disk substrate.

The assembly carriage device 310 is a device for positioning the thermally-assisted magnetic recording head 1 on a track of the magnetic disk 301. In the assembly carriage device 310, the drive arms 311 are stacked in a direction along a pivot bearing axis 313, and are angularly pivotable by a voice coil motor (VCM) 314 to set a pivot bearing shaft 313 as the center.

Furthermore, the structure of the magnetic disk device in the present embodiment is not limited to the structure described above, but the magnetic disk 301, the drive arm 311, the HGA 312 and the thermally assisted magnetic recording head 1 may be singular, respectively.

In the HGA 312 shown in FIG. 2, a suspension 320 includes a load beam 321, a flexure 322 affixed to the load beam 321 and having flexibility, and a base plate 323 provided at the base part of the load beam 321. Further, on the flexure 322, a wiring member 324 made from a lead conductor and connection pads that are electrically connected to both ends of the lead conductor are provided. The thermally-assisted recording head 1 relating to the present embodiment is affixed to the flexure 322 at the front end portion of the suspension 320 so as to be opposed to the surface of each magnetic disk 301 at predetermined intervals (flying height). In addition, one end of the wiring member 324 is electrically connected to the terminal electrode of the thermally-assisted magnetic recording head 1 relating to the present embodiment. Furthermore, the structure of the suspension 320 in the present embodiment is also not limited to the structure described above.

As shown in FIG. 3, the thermally-assisted magnetic recording head 1 relating to the present embodiment includes a slider 10 and a light source unit 50. The slider 10 is formed from AlTiC ($Al_2O_3$—TiC) and the like, and includes a slider substrate 11 having an air bearing surface (ABS) 11a as a medium opposed surface processed so as to obtain appropriate flying height, and a head part 12 formed on an element formation surface 11b that is perpendicular to the ABS 11a.

Further, the light source unit 50 is formed from AlTiC ($Al_2O_3$—TiC) and the like, and includes a unit substrate 51 having an adhering surface 51a and a laser diode 60 as a light source provided on a light source installation surface 51b that is perpendicular to the adhering surface 51a.

Herein, the slider 10 and the light source unit 50 are mutually adhered, while a rear surface 11c of the slider substrate 11 and an adhering surface 51a of the unit substrate 51 are in contact. The rear surface 11c of the slider substrate 11 refers to an end surface at the opposite side from the ABS 11a of the slider substrate 11. Furthermore, the thermally-assisted magnetic recording head 1 relating to the present embodiment may be in a form where the laser diode 60 is directly mounted onto the slider 10 without using the light source unit 50.

The head part 12 formed on the element formation surface 11 of the slider substrate 11 includes a head element 20 having an MR element 21 for reading data from the magnetic disk 301 and an electromagnetic transducer element 22 for writing data onto the magnetic disk 301, a waveguide 23 for guiding laser light from the laser diode 60 included in the light source unit 50 to the medium opposed surface side, a plasmon-generator 24 configuring a near-field light generation optical system along with the waveguide 23, a protection layer 31 formed on the element formation surface 11b so as to cover the MR element 21, the electromagnetic transducer element 22, the waveguide 23 and the plasmon-generator 24, a pair of first terminal electrodes 25a that are exposed to an upper surface of the protection layer 31 and are electrically connected to the MR element 21, and a pair of second terminal electrodes 25b that are exposed to an upper surface of the protection layer 31 and are electrically connected to the electromagnetic transducer element 22. These first and second terminal electrodes 25a and 25b are electrically connected to a connection pad of the wiring member 324 provided in the flexure 322 (see FIG. 2).

Respective ends of the MR element 21, the electromagnetic transducer element 22, the plasmon-generator 24 and the waveguide 23 reach a head part end surface 12a, which is a medium opposed surface of the head part 12. Herein, the head part end surface 12a and the ABS 11a constitute the medium opposed surface of the entire thermally-assisted magnetic recording head 1 relating to the present embodiment.

Upon actual writing or reading, the thermally-assisted magnetic recording head 1 hydrodynamically flies on the rotating magnetic disk 301 surface at a predetermined flying height. In this situation, end surfaces of the MR element 21 and the electromagnetic transducer element 22 face a surface of the magnetic recording layer of the magnetic disk 301 via appropriate magnetic spacing. In this situation, the MR element 21 senses a data signal magnetic field from the magnetic recording layer and performs reading, and the electromagnetic transducer element 22 applies a data signal magnetic field to a magnetic recording layer and performs writing.

A flying height in this case is a very important parameter when characteristics must be demonstrated, such as high recording density. In the present embodiment, it is possible to fly the thermally-assisted magnetic recording head 1 stably at an extremely small flying height (for example, approximately 2 nm) by setting a flying height using a method described later.

When writing, laser light that has propagated through the waveguide 23 from the laser diode 60 of the light source unit 50 is coupled with the plasmon-generator 24 in a surface plasmon mode, and excites the surface plasmon in the plasmon-generator 24. Near-field light is generated at the end portion of the plasmon-generator 24 at the head part end surface 12a side because this surface plasmon propagates through the plasmon-generator 24 toward the head part end surface 12a. This near-field light reaches the surface of the magnetic disk 301 and heats a magnetic recording layer portion of the magnetic disk 301 resulting in reduction of an anisotropy field (coercive force) to a value that enables writing to be performed. It becomes possible to perform thermally-assisted magnetic recording by applying a writing magnetic field to this portion where the anisotropy field has been reduced.

Figure 4:
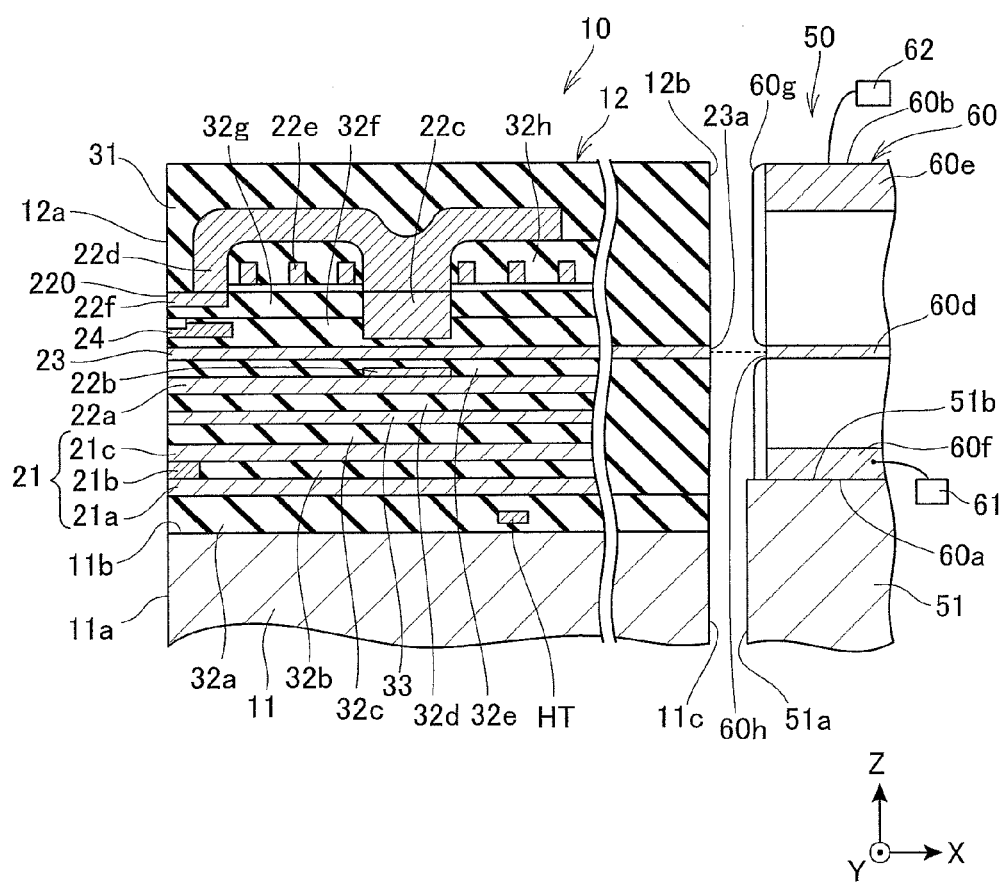
FIG. 4 is a cross sectional view (XZ plane) along the line A-A in FIG. 3, schematically showing configuration of a primary part of the thermally-assisted magnetic recording head relating to one embodiment of the present invention.

FIG. 4 is a cross sectional view (XZ plane) along the line A-A in FIG. 3, schematically showing configuration of the thermally-assisted magnetic recording head 1 relating to the present embodiment.

As shown in FIG. 4, the MR element 21 has a lower side shield layer 21a formed on an insulation layer 32a on the element formation surface 11b of the slider substrate 11, an MR multilayer body 21b formed on the lower side shield layer 21a, and an upper side shield layer 21c formed on the MR multilayer body 21b, and an insulation layer 32b is provided between the lower side shield layer 21a and the upper side shield layer 21c around the periphery of the MR multilayer body 21b. The lower side shield layer 21a and the upper side shield layer 21c prevent the MR multilayer body 21b from being effected by an external magnetic field that becomes noise.

The lower side shield layer 21a and the upper side shield layer 21c are magnetic layers each with a thickness of approximately 0.5 μm to 3 μm formed using, for example, a frame plating method, a sputtering method or the like, and are made from a soft magnetic material, such as NiFe (permalloy), FeSiAl (sendust), CoFeNi, CoFe, FeN, FeZrN or CoZrTaCr, or a multilayer film of these materials.

The MR multilayer body 21b is a magnetically sensitive part that senses a signal magnetic field by utilizing the MR effect, and for example, it can be any of a Current In Plane-Giant Magneto-Resistance (CIP-GMR) multilayer body utilizing an in-plane current passage type giant magneto-resistance effect, a Current Perpendicular to Plane-Giant Magneto-Resistance (CPP-GMR) multilayer body utilizing a perpendicular current passage type giant magneto-resistance effect or a Tunneling Magneto-Resistance (TMR) multilayer body utilizing a tunneling magneto-resistance effect. Furthermore, when the MR multilayer body 21b is a CPP-GMR multilayer body or a TMR multilayer body, the lower side shield layer 21a and the upper side shield layer 21c fulfill roles as electrodes. In the meantime, when the MR multilayer body 21b is a CIP-GMR multilayer body, insulation layers are provided between the MR multilayer body 21b and the lower side shield layer 21a, and between the MR multilayer body 21b and the upper side shield layer 21c, respectively, and an MR lead layer that is electrically connected to the MR multilayer body 21b is further provided.

When the MR multilayer body 21b is a TMR multilayer body, the MR multilayer body 21b has a structure where an anti-ferromagnetic layer with thickness of approximately 5 nm to 15 nm made from, for example, IrMn, PtMn, NiMn, RuRhMn or the like, a magnetization pinned layer where two ferromagnetic metal layer made from, for example, CoFe or the like, intervene a non-magnetic metal layer, such as Ru, and where its magnetization direction is pinned by an anti-ferromagnetic layer, a tunnel barrier layer made from a non-magnetic dielectric material where a metal film with thickness of 0.5 nm to 1 nm made from, for example, Al, AlCu, Mg or the like is oxidized by oxygen introduced into a vacuume device or by spontaneous oxidation, and a magnetization free layer that is configured with a two-layer film, for example, with CoFe, which is a ferromagnetic material, with thickness of approximately 1 nm and NiFe with thickness of approximately 3 nm to 4 nm, and that tunnel exchange-couples with the magnetization pinned layer via a tunnel barrier layer are sequentially laminated.

The head part 12 in the present embodiment includes a non-magnetic layer 32c provided on the upper side shield layer 21c, an inter-element shield layer 33 provided on the non-magnetic layer 32c and an insulation layer 32d provided on the inter-element shield layer 33. This inter-element shield layer 33 may be formed with a soft magnetic material, and has a function to shield the MR element 21 from a magnetic field that is generated in the electromagnetic transducer element 22 provided on the insulation layer 32d. Furthermore, the non-magnetic layer 32c and the inter-element shield layer 33 may be omitted.

The electromagnetic transducer element 22 includes a lower side yoke layer 22a that is for perpendicular magnetic recording, and that is provided on the insulation layer 32d, a first linkage layer 22b provided on the lower side yoke layer 22a at a position away from the head part end surface 12a in the X-axis direction (height direction), a second linkage layer 22c that continues to the first linkage layer 22b, an upper side yoke layer 22d that is provided on the second linkage layer 22c, and that does not reach the head part end surface 12a, a writing coil 22e having a spiral structure wound around the second linkage layer 22c as the center so as to at least pass through the space between the lower side yoke layer 22a and the upper side yoke layer 22d during one turn, and a magnetic pole 22f that continues to the upper part yoke layer 22d, and that reaches the head part end surface 12a so as to form a portion of the head part end surface 12a.

The head part 12 in the present embodiment includes a dielectric layer 32e provided on the lower side yoke layer 22a, a dielectric layer 32f provided around a periphery of the second linkage layer 22c and around a periphery of the plasmon-generator 24, a non-magnetic layer 32g provided on the dielectric layer 32f, an insulation layer 32h provided in the interwinding of the writing coil 22e and around its periphery, and a protection layer 31 provided on the upper side yoke layer 22d.

In the head part 12 of the present embodiment, the lower side yoke layer 22a, the first linkage layer 22b, the second linkage layer 22c, the upper side yoke layer 22d and the magnetic pole 22f configure a waveguide for allowing passage of a magnetic flux corresponding to a magnetic field generated by the writing coil 22e and for guiding it to the magnetic recording layer (perpendicular magnetization layer) of the magnetic disk 301. The end surface 220 of the magnetic pole 22f that is the closest to the leading side and that forms a portion of the head part end surface 12a is a point to generate a writing magnetic field.

It is preferable that the magnetic pole 22f is made from a soft magnetic material having higher saturation magnetic flux density than the upper side yoke layer 22d, and for example, it is made from a soft material, such as FeNi, FeCo, FeCoNi, FeN or FeZrN, which is an iron-based alloy material consisting mainly of Fe. Furthermore, thickness of the magnetic pole 22f in the Z-axis direction can be set to 0.1 μm to 0.8 μm.

Further, the width of the magnetic pole 22f in the Y-axis direction is preferably 0.2 μm to 0.4 μm. If the width of the magnetic pole 22f in the Y-axis direction is within the range above, a magnetic field having writable intensity can be adequately applied to a heating spot of the magnetic disk 301 that is heated by the near-field light irradiated from the near-field light generating portion of the plasmon-generator 24.

The end surface of the upper side yoke layer 22d at the head part end surface 12a side is positioned at a recessed location by predetermined distance at the head part rear end surface 12b side along the X-axis direction from the head part end surface 12a. This enables a magnetic flux to be focused onto the magnetic pole 22f, and intensity of a magnetic field that is generated from the magnetic pole 22f to be enhanced.

The writing coil 22e is formed from a conductive material, such as Cu (copper). Furthermore, the writing coil 22e is one layer in the present embodiment, but it may be two layers or more, or may be a helical coil arranged so as to interpose the upper side yoke layer 22d. Further, the wire turns of the writing coil 22e should not be particularly limited, but for example, they can be set to 2 to 7 turns.

The lower side yoke layer 22a is formed on the insulation layer 32d made from an insulation material, such as $Al_2O_3$ (alumina), and fulfills a role as a waveguide to guide a magnetic flux returned from a soft magnetic under layer provided under the magnetic recording layer (perpendicular magnetization layer) of the magnetic disk 301. The lower side yoke layer 22a is formed from a soft magnetic material, and its thickness is, for example, approximately 0.5 μm to 5 μm.

The waveguide 23 extends to a front end surface 23b forming a portion of the head part front end surface 12a from the rear end surface 23a forming a portion of the head part rear end surface 12b parallel to the element formation surface 11b. The plasmon-generator 24 is provided below (leading side) the magnetic pole 22f so as to face the waveguide 23 having predetermined intervals. The waveguide 23 and the plasmon-generator 24 form an optical system for near-field light generation within the head part 12. Further, a portion between the upper surface (a portion of side surface) of the waveguide 23 and the lower surface of the plasmon-generator 24 is a buffer portion 40 having a lower refractive index than that of the waveguide 23.

The buffer portion 40 fulfills a role to couple laser light propagating in the waveguide 23 with plasmon-generator 24 in a surface plasmon mode. Furthermore, the buffer portion

40 may be a portion of the dielectric layer 32f, and may be a new layer provided separately from the dielectric layer 32f.

Furthermore, specific configurations of the magnetic pole 22f, the waveguide 23 and the plasmon-generator 24 will be described later.

A heater part HT is incorporated at the back side of the head part end surface 12a within the insulation layer 32a. A lead wire (not shown) is connected to this heater part HT, and the heater part HT produces heat because the heater power is supplied via the lead wire, and the head part end surface 12a is thermally expanded and can be protruded toward the magnetic disk 301 side.

As shown in FIG. 4, the light source unit 50 includes a unit substrate 51, a laser diode 60 provided on a light source installation surface 51b of the unit substrate 51, a first drive terminal electrode 61 that is electrically connected to an electrode forming a lower surface 60a (see FIG. 3) of the laser diode 60, and a second drive terminal electrode 62 that is electrically connected to an electrode forming an upper surface 60b (see FIG. 3) of the laser diode 60. The first and second drive terminal electrodes 61 and 62 are electrically connected to a connection pad of the wire member 324 (see FIG. 2) provided in the flexure 322 (see FIG. 2). When a predetermined drive current is applied to the laser diode 60 via the first and second drive terminals 61 and 62, laser light is radiated from an emission center positioned on the light emission surface 60c of the laser diode 60. Herein, in the head structure as shown in FIG. 4, it is preferable that an oscillation direction of an electric field of the laser light that is generated by the laser diode 60 is perpendicular (Z-axis direction) relative to the lamination surface of an active layer 60d. In other words, it is preferable that the laser light that is generated by the laser diode 60 is polarized light in TM mode. This enables laser light propagating in the waveguide 23 to be appropriately coupled with the plasmon-generator 24 in the surface plasmon mode via the buffer portion 40.

As the laser diode 60, substances that are normally used for communication, such as InP-series, GaAs-series or GaN-series, for optical system disk storage or for material analysis, are usable, and wavelength 4 of the laser light to be radiated should be within the range of, for example, 375 nm to 1.7 μm.

Specifically, for example, InGaAsP/InP quaternion mixed crystal system laser diode where its possible wavelength range is identified as 1.2 μm to 1.67 μm is also usable. The laser diode 60 has a multilayer structure including an upper side electrode 60e, an active layer 60d and a lower side electrode 60f. A reflective layer for exciting oscillation by total reflection is formed in front and at the rear of a cleavage surface of this multilayer structure, and an opening is provided at a position of the active layer 60d including the emission center 60h in the reflective layer 60g. Herein, thickness of the laser diode 60 can be set to, for example, approximately 60 μm to 200 μm.

Further, in driving of this laser diode 60, a power source within a magnetic disk device is usable. In actuality, the magnetic disk device normally includes a power source of, for example, approximately 5 V, and has sufficient voltage for the laser oscillation operation. Further, consumption power of the laser diode 60 is also, for example, approximately several dozens of mW, and it can be covered with a power source within the magnetic disk device. In actuality, a predetermined voltage is applied between the first drive terminal electrode 61 that is electrically connected to the lower side electrode 60f and the second drive terminal electrode 62 that is electrically connected to the upper side electrode 60e due to the power source, and laser light is radiated from an opening including the emission center 60h of the reflective layer 60g by oscillating the laser diode 60. Furthermore, the laser diode 60 and the first and second drive terminal electrodes 61 and 62 are not limited to those in the embodiment above. For example, the electrodes may be turned upside down in the laser diode 60, and the upper side electrode 60e may be adhered to the light source installation surface 51b of the unit substrate 51. Further, it is also possible to provide the laser diode on the element formation surface 11b of the thermally-assisted magnetic recording head 1, and to optically connect this laser diode with the waveguide 23. In addition, the thermally-assisted magnetic recording head 1 does not include with the laser diode 60, and the emission center of the laser diode provided within the magnetic disk device may be connected to the rear end surface 23a of the waveguide 23, for example using an optical fiber and the like.

Although the sizes of the slider 10 and the light source unit 50 are variable, and for example, the slider 10 may be a so-called femto slider with 700 μm of width in a track width direction (Y-axis direction)×850 μm of length (in Z-axis direction)×230 μm of thickness (in X-axis direction). In this case, the light source unit 50 may be slightly smaller than this, for example, 425 μm of width in a track width direction×300 μm of length and ×300 μm of thickness.

The thermally-assisted magnetic recording head 1 is configured by connecting the light source unit 50 with the slider 10. In this connection, the adhering surface 51a of the unit substrate 51 and the rear surface 11c of the slider substrate 11 are in contact, and on that occasion, the positions of the unit substrate 51 and the slider substrate 11 are determined so as to allow the laser light generated from the laser diode 60 to enter into the rear end surface 23a, which is at the opposite side of the ABS 11a in the waveguide 23.

Figure 5:
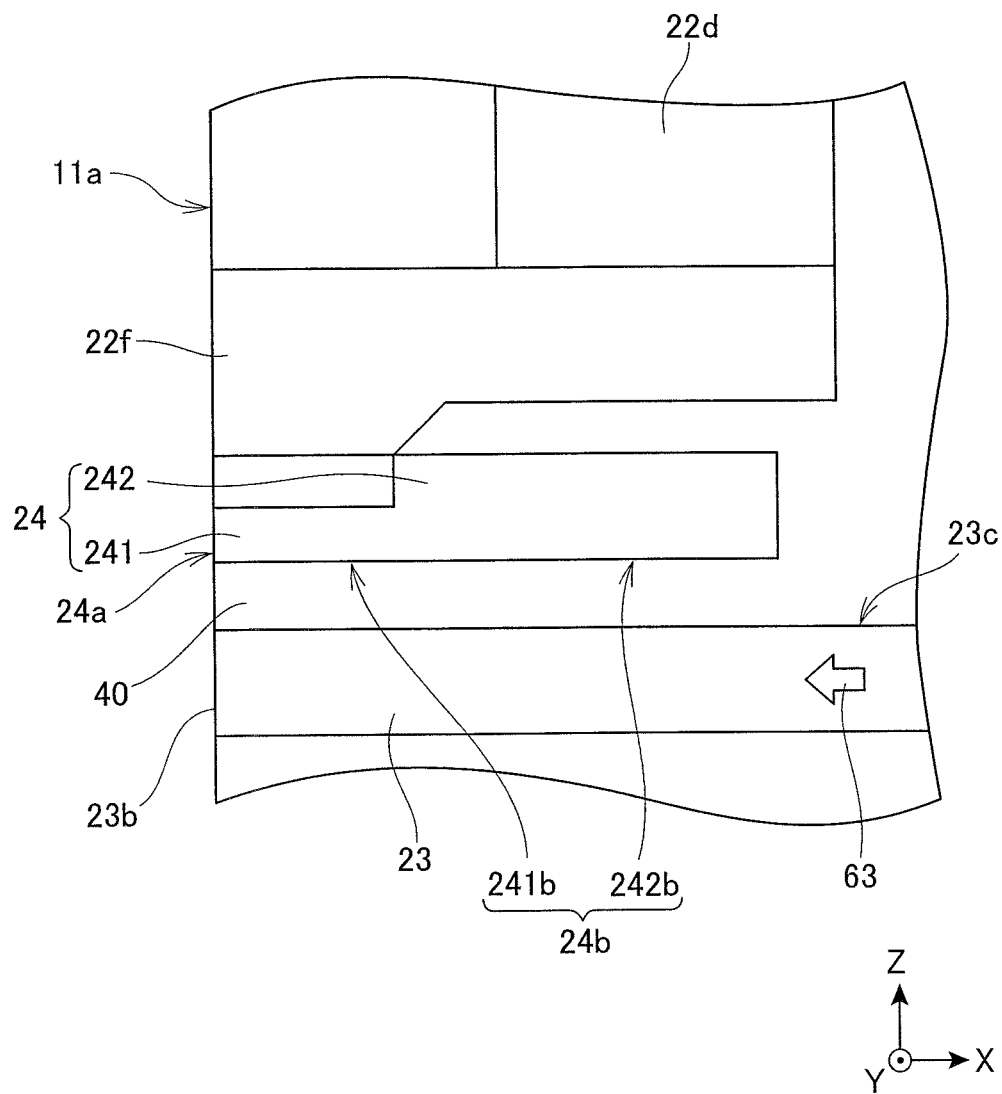
FIG. 5 is a cross sectional view (XZ plane) schematically showing configuration of a waveguide, a plasmon-generator and a magnetic pole in the thermally-assisted magnetic recording head relating to one embodiment of the present invention.

Next, specific configuration of the waveguide 23, the plasmon-generator 24 and the magnetic pole 22f in the thermally-assisted magnetic recording head 1 relating to the present embodiment is explained. FIG. 5 is a cross sectional view schematically showing the configuration of the waveguide 23, the plasmon 24 and the magnetic pole 22f in the thermally-assisted magnetic recording head 1 relating to the present embodiment.

As shown in FIG. 5, the thermally-assisted magnetic recording head 1 relating to the present embodiment includes the waveguide 23 for propagating the laser light 63 for near-field light generation, and the plasmon-generator 24 where a surface plasmon, which is excited by the laser light (waveguide light) 63, propagates.

The plasmon-generator 24 has near-field light generating end surface 24a that has reached the head part end surface 12a. Further, a portion between the portion of the side surface 23c of the waveguide 23 and the lower surface 24b of the plasmon-generator 24 is the buffer portion 40. This buffer portion 40 fulfills a role to couple the laser light (waveguide light) with the plasmon-generator 24 in a surface plasmon mode. Further, the lower surface 24b of the plasmon-generator 24 fulfills a role to propagate the surface plasmon that is excited by the laser light (waveguide light) to the near-field light generating end surface 24a.

Furthermore, in the present embodiment, a side surface of the waveguide 23 refers to an end surface other than the front end surface 23b and the rear end surface 23a facing the front end surface 23b, out of end surfaces surrounding the waveguide 23. The side surface of this waveguide 23 becomes a surface where propagating laser light (waveguide light) can be totally reflected in the waveguide 23 that is equivalent to a core. Furthermore, in the present embodiment, the side surface 23c of the waveguide 23 where its portion contacts the buffer portion 40 is an upper surface of the waveguide 23.

More specifically, the laser light (waveguide light) that has progressed to the vicinity of the buffer portion 40 is coupled with optical configuration of the waveguide 23 having a predetermined refractive index $n_{WG}$, the buffer portion 40 having a predetermined refractive index $n_{BF}$ and the plasmon-generator 24 made from a conductive material, such as metal, to induce the surface plasmon mode on the lower surface 24b (surface) of the plasmon-generator 24. In other words, it is coupled with the plasmon-generator 24 in a surface plasmon mode. It becomes possible to induce this surface plasmon mode by setting the refractive index $n_{BF}$ of the buffer portion 40 to be smaller than the refractive index $n_{WG}$ of the waveguide 23 ($n_{BF} < n_{WG}$). In actuality, evanescent light is excited within the buffer portion 40 according to optical interface conditions between the waveguide 23, which is a core, and the buffer portion 40. Next, the surface plasmon mode is induced in a form where this evanescent light is coupled with a fluctuation of electric charge that is excited on the surface of the plasmon-generator 24, and a surface plasmon 70 (see FIG. 6) is excited.

Space (thickness of the buffer portion 40 immediately under the plasmon-generator 24) between the upper surface of the waveguide 23 (opposite surface from the plasmon-generator 24) and the lower surface 24b of the plasmon-generator 24 shall not be particularly limited as long as the surface plasmon 70 can be excited on the lower surface 24b of the plasmon-generator 24.

The plasmon-generator 24 has a first PG part 241 extending in the perpendicular direction relative to the ABS 11a from the ABS 11a, and a second PG part 242 continuing to the first PG part 241 at the back side from the ABS 11a.

The lower surface 241b of the first PG part 241 and the lower 242b of the second PG part 242 are configured to be co-planar. The lower surface 24b of the plasmon-generator 24 configured with the lower surface 241b of this first PG part 241 and the lower surface 242b of the second PG part 242 faces the waveguide 24 via the buffer portion 40, and the lower surface 241b of the first PG part 241 extends to the near-field light generating end surface 24a. This enables to propagate the surface plasmon that is excited by the laser light (waveguide light), which has propagated in the waveguide 23, to the near-field light generating end surface 24a. In other words, the plasmon-generator 24 is coupled with the waveguide light in the surface plasmon mode and propagates the surface plasmon to the lower surfaces 241b and 242b of the first PG part 241 and the second PG part 242, and propagates the surface plasmon to the near-field light generating end surface 24a through the lower surface 241b of the first PG part 241 at last. As a result, near-field light is generated from near-field light generating portion NFP on the near-field light generating end surface 24a.

In the plasmon-generator 24, the second PG part 242 has a front end portion continuing to the first PG part 241 and a rear end portion positioned at farther back side than the front end portion. Then, width of the plasmon-generator 24 (second PG part 242) in the track width direction (Y-axis direction) is gradually increased from the front end portion of the second PG part 242 toward the rear end portion. The surface plasmon is efficiently excited on the lower surface 242b of the second PG part 242 having a relatively wide area because of the shape of the second PG part 242, and the surface plasmon propagating on the lower surface 242b of the second PG part 242 can be focused toward the end surface 241a of the first PG part 241 (near-field light generating end surface 24a). As a result, near-field light with desired intensity can be generated.

As the shape of the waveguide 23, the width in the track width direction (Y-axis direction) may be constant, but the width in the track width direction (Y-axis direction) in a portion positioned in the vicinity of the ABS 11a may be narrower. The width in the track width direction (Y-axis direction) in a portion at the rear end surface 23a side positioned at the opposite side from the front end surface 23b of the waveguide 23 can be, for example, approximately 0.5 μm to 20 μm, the width in the track width direction (Y-axis direction) in a portion at the front end surface 23b side can be, for example, approximately 0.3 μm to 10 μm, thickness in the Z-axis direction can be approximately 0.1 μm to 4 μm, and height (length) in the X-axis direction can be, for example, approximately 10 μm to 300 μm.

The upper surface 23c and both end surfaces in the track width direction (Y-axis direction) of the waveguide 23 contact the dielectric layer 32f (see FIG. 4) except for a portion contacting the buffer portion 40, and the lower surface of the waveguide 23 contacts the dielectric layer 32e (see FIG. 4). Herein, the waveguide 23 is made from a material having a higher refractive index $n_{WG}$ than the refractive index $n_{IS}$ of the dielectric layer 32e and the dielectric layer 32f. For example, when wavelength $\lambda_L$ of the laser light is 600 nm and the dielectric layer 32e and the dielectric layer 32f are formed from $SiO_2$ (silicon dioxide; n=1.46), the waveguide 23 may be formed from $Al_2O_3$ (alumina; n=1.63). In addition, when the dielectric layer 32e and the dielectric layer 32f are formed from $Al_2O_3$ (n=1.63), the waveguide 23 may be made from $SiO_XN_Y$ (n=1.7 to 1.85), $Ta_2O_5$ (n=2.16), $Nb_2O_5$ (n=2.33), TiO (n=2.3 to 2.55) or $TiO_2$ (n=2.3 to 2.55). Because the waveguide 23 is made from such materials, a propagation loss of the laser light (waveguide light) 63 can be kept low due to excellent optical characteristics of the materials themselves. In addition, while the waveguide 23 functions as a core, the dielectric layer 32e and the dielectric layer 32f fulfill a function as a cladding, and total reflection conditions on the entire side surface shall be restored. This results more laser light (waveguide light) 63 at the position of the buffer portion 40, and in improvement of a propagation efficiency of the waveguide 23.

Further, the waveguide 23 has a multilayer structure of the dielectric material, and may have a structure where the more refractive index becomes higher as the elevation at which the layer is situated increases. For example, such multilayer structure is realized by sequentially laminating dielectric materials where a composition ratio of X and Y values in $SiO_XN_Y$ are appropriately changed. The number of laminations may be set to, for example, 8 layers to 12 layers. As a result, when laser light (waveguide light) is a linearly polarized light in the Z-axis direction, the laser light (waveguide light) can be propagated to the buffer portion 40 side in the Z-axis direction. On this occasion, a desired propagation position in the Z-axis direction of the laser light (waveguide light) can be realized by selecting a composition, layer thickness and the number of layers of each layer in this multilayer structure.

The buffer portion 40 is formed from a dielectric material having a lower refractive index $n_{BF}$ than the refractive index $n_{WG}$ of the waveguide 23. For example, when wavelength 4 of the laser light is 600 nm and the waveguide 23 is formed from $Al_2O_3$ (alumina; n=1.63), the buffer portion 40 may be made from $SiO_2$ (silicon dioxide; n=1.46). Further, when the waveguide 23 is formed from $Ta_2O_5$ (n=2.16), the buffer portion 40 may be made from $SiO_2$ ($SiO_2$; n=1.46) or $Al_2O_3$ (n=1.63). In these cases, this buffer portion 40 can be a portion of the dielectric layer 32f (see FIG. 4) as a cladding made from $SiO_2$ (n=1.46) or $Al_2O_3$ (n=1.63). Further, length of the buffer portion 40 (in the X-axis direction), which is a portion between the upper surface 23c of the waveguide 23 and the lower surface 24b of the plasmon-generator 24, is preferably 0.5 μm to 5 μm, and [its wavelength] is preferably greater than wavelength 4 of the laser light (waveguide light). In this case, that portion is a much wider region than the so-called "focal region", in the case when the laser light is collected onto the buffer portion 40 and the plasmon-generator 24 and is coupled in the surface plasmon mode, and a very stable coupling in surface plasmon mode becomes possible. Further, the thickness of the buffer portion 40 (in the Z-axis direction) is preferably 10 nm to 200 nm. Length (in the X-axis direction) and thickness (in the Z-axis direction) of the buffer portion 40 are important parameters in order to obtain appropriate excitation and propagation of the surface plasmon.

The magnetic pole 22f has reached the head part end surface 12a, and an end surface of the magnetic pole 22f on the head part end surface 12a substantially has, for example, a rectangular shape, such as rectangle, square or trapezoid.

<Operation of Thermally-Assisted Magnetic Recording Head>

Figure 6:
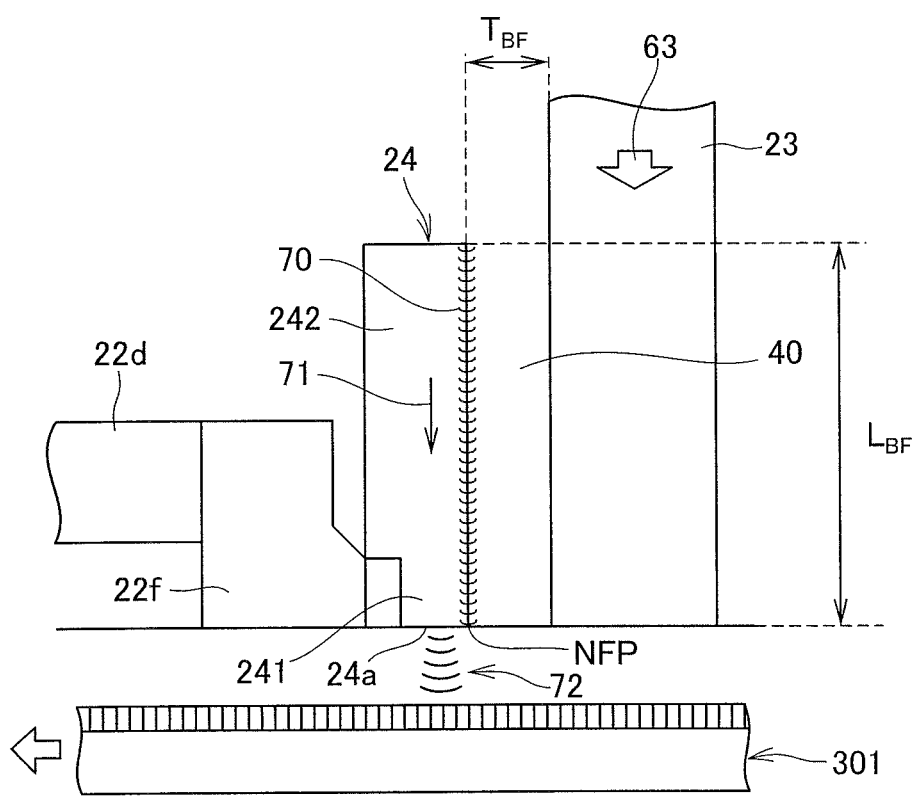
FIG. 6 is a perspective view schematically showing the configuration of the plasmon-generator in one embodiment of the present invention.

Next, operation of the thermally-assisted magnetic recording head 1 relating to the present embodiment having the configuration above is explained. FIG. 6 is a schematic view for explaining thermally-assisted magnetic recording utilizing a surface plasmon mode in the thermally-assisted magnetic recording head 1 relating to the present embodiment.

As shown in FIG. 6, when writing to a magnetic recording layer of the magnetic disk 301 by the electromagnetic transducer element 22, at first, the laser light (waveguide light) 63 radiated from the laser diode 60 of the light source unit 50 propagates in the waveguide 23. Next, the laser light (waveguide light) 63 that has progressed in the vicinity of the buffer portion 40 is coupled with an optical configuration of the waveguide 23 having the refractive index $n_{WG}$, the buffer portion 40 having the refractive index $n_{BF}$ and the plasmon-generator 24 made from a conductive material, such as metal, to induce the surface plasmon mode on the lower surface 24b of the plasmon-generator 24 (lower surface of the second PG part 242). In other words, the laser light 63 is coupled with the plasmon-generator 24 in the surface plasmon mode. In actuality, evanescent light is excited within the buffer portion 40 from optical interface conditions between the waveguide 23, which is a core and the buffer portion 40. Next, the surface plasmon mode is induced in a form where this evanescent light is coupled with fluctuation of electric charge excited on the lower surface 24b of the plasmon-generator 24, and the surface plasmon is excited. Furthermore, precisely, since the surface plasmon, which is elementary excitation in this system, will be coupled with electromagnetic wave, what is excited is a surface plasmon polariton. However, hereafter, the surface plasmon polariton is abbreviated and referred to as a surface plasmon. It becomes possible to induce this surface plasmon mode by setting the refractive index $n_{BF}$ of the buffer portion 40 to be smaller than the refractive index $n_{WG}$ of the waveguide 23 ($n_{BF} < n_{WG}$), and by appropriately selecting length of the buffer portion 40 (in the X-axis direction), i.e., length LBF of the coupled portion between the waveguide 23 and the plasmon-generator 24 (length of the plasmon-generator 24 in the X-axis direction) and thickness $T_{BF}$ of the buffer portion 40.

In this induced surface plasmon mode, the surface plasmon 70 is excited on the lower surface 24b of the plasmon-generator 24, and propagates along the direction of arrow 71.

Thus, the surface plasmon 70 propagates in the direction of the arrow 71, and the surface plasmon 70, i.e., an electric field shall be focused onto the near-field light generating portion NFP on the near-field light generating end surface 24a. As a result, near-field light 72 is generated from this near-field light generating portion NFP.

The near-field light 72 generated as mentioned above is irradiated toward the magnetic recording layer of the magnetic disk 301, reaches the surface of the magnetic disk 301, and heats the magnetic recording layer portion of the magnetic disk 301. This results in reduction of the anisotropy field (coercive force) in that portion to a value that enables writing to be performed, and writing is performed by the magnetic field applied to that portion. Upon writing, regarding the space between the head part end surface 12a and the magnetic disk 301, i.e., flying height of the thermally-assisted magnetic recording head 1 relative to the magnetic disk 301 as a target flying height, heater power is supplied to the heater part HT and the head part end surface 12a is protruded toward the magnetic disk 301 side. Furthermore, even when information written in the magnetic disk 301 is read, heater power is similarly supplied to the heater part HT, and the head part end surface 12a is protruded toward the magnetic disk 301 side.

Herein, due to the generation of the near-field light 72, heat is generated in the vicinity of the near-field light generating portion NFP on the near-field light generating end surface 24a. Due to thermal expansion attributable this heat generation, the head part end surface 12a protrudes toward the magnetic disk 301 side. Consequently, in a flying height setting method to be described later, considering the protrusion of this head part end surface 12a, flying height of the thermally-assisted magnetic recording head 1 shall be set.

<Flying Height Setting Method>

Figure 7:
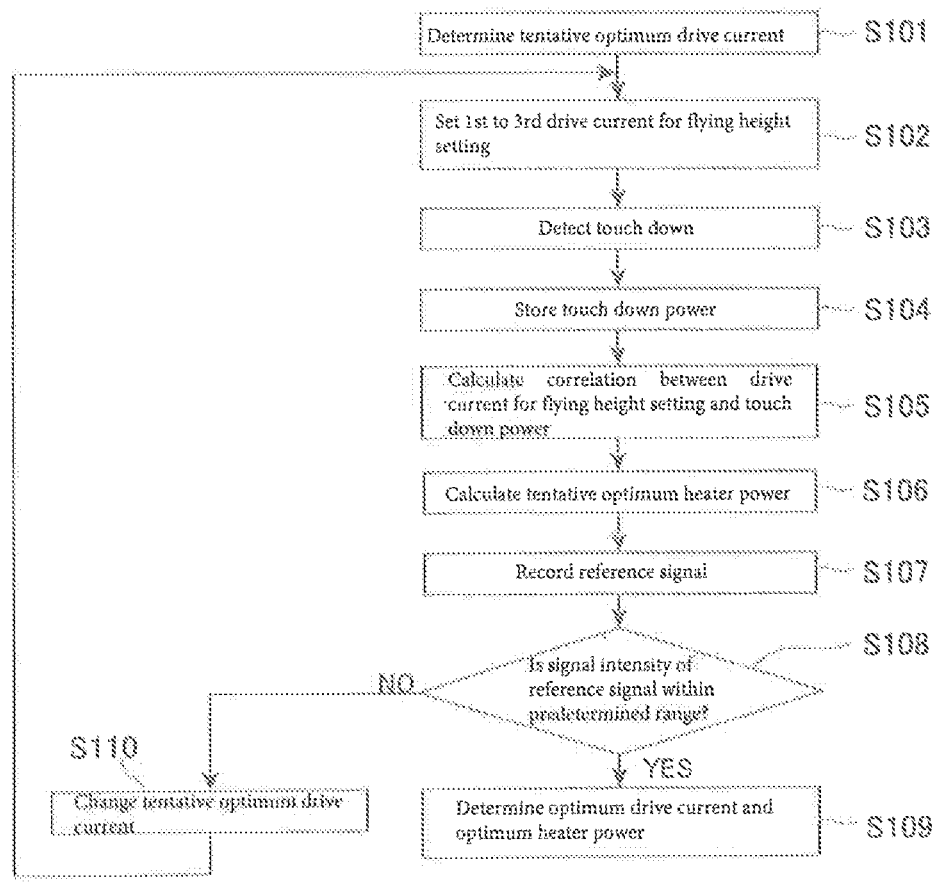
FIG. 7 is a flowchart showing a flying height setting method relating to one embodiment of the present invention.

Subsequently, in the thermally-assisted magnetic disk device having the configuration above, a method for setting flying height of the thermally-assisted magnetic recording head is explained. FIG. 7 is a flowchart showing the flying height setting method relating to the present embodiment.

First, the thermally-assisted magnetic disk device having the configuration above, which is a subject for setting the flying height, is prepared. Then, a tentative optimum drive current $LDI_0$ that is supplied to the laser diode 60 in the thermally-assisted magnetic recording head 1 is determined (S101). The tentative optimum drive current $LDI_0$ is a drive current that is predicted where it is possible to generate near-field light with predetermined light intensity and spot diameter from the near-field light generating portion NFP of the thermally-assisted magnetic recording head 1 that has flown with the target flying height, and it can be determined to any current value considering rated current of the laser diode 60.

Next, 1st to 3rd drive currents for flying height setting $LDI_1$ to $LDI_3$ that are smaller than the tentative drive current $LDI_0$ determined in S101 (for example, 50%, 60% and 70% of the tentative optimum drive current $LDI_0$ determined in S101) are set (S102). Then, the 1st drive current for flying height setting $LDI_1$ (a current, which is 50% of the tentative optimum drive current $LDI_0$ determined in S101) is supplied to the laser diode 60, and near-field light is generated. Under that situation, a write current $I_W$ is supplied to the writing coil 22e, and heater power HTP is supplied to the heater part HT, and while the heater power HTP is gradually increased, the head part end surface 12a of the thermally-assisted magnetic recording head 1 is protruded. Then, touch down of the thermally-assisted magnetic recording head 1 is detected (S103).

When the tentative optimum drive current $LDI_0$ determined in S101 is supplied to the laser diode 60 and near-field light is generated, protrusion shape of the head part end surface 12a is likely to be precipitous due to heat attributable to the near-field light. If the protrusion shape of the head part end surface 12a becomes precipitous, it becomes difficult to detect contact between the head part end surface 12a and the magnetic disk 301, i.e., touch down. Regardless of contacting the head part end surface 12a and the magnetic disk 301, if the touch down cannot be detected, the heater power HTP that is supplied to the heater part HT is further increased, and the head part end surface 12a shall be further protruded. Then, the head part end surface 12a of the thermally-assisted magnetic recording head 1 is further pushed, and the thermally-assisted magnetic recording head 1 and the magnetic disk 301 can be damaged. However, if the 1st to 3rd drive currents for flying height setting $LDI_1$ to $LDI_3$, which are smaller current values than the tentative optimum drive current $LDI_0$ determined in S101, are supplied to the laser diode 60 and the near-field light is generated, the protrusion shape of the head part end surface 12a will not be precipitous, and the contact (touch down) between the head part end surface 12a and the magnetic disk 301 can become easily detected. Therefore, a touch down test can be implemented without causing damage to the thermally-assisted magnetic recording head 1 and the magnetic disk 301.

The 1st to 3rd drive currents for flying height setting $LDI_1$ to $LDI_3$ can be set within the range of 30% to 70% of the tentative optimum drive current determined in S101, preferably 30% to 70%, more preferably 50% to 70%, and particularly preferably 50% to 60%. If the 1st drive current for flying height setting $LDI_1$ is less than 30% of the tentative optimum drive current $LDI_0$ determined in S101, due to the correlation described later, when touch down power WTDP corresponding to the tentative optimum drive current $LDI_0$ determined in S101 is calculated, an error is likely to be too large. In the meantime, if the 3rd drive current for flying height setting $LDI_3$ exceeds 70% of the tentative optimum drive current $LDI_0$ determined in S101, the protrusion shape of the medium opposed surface becomes precipitous, and it is likely to be difficult to detect touch down.

Furthermore, the mth drive current for flying height setting (m is one or greater of integer), which is M % of the tentative optimum drive current $LDI_0$, can be calculated with the following formula:

$$LDI_m = LDI_0 - (LDI_0 - Ith) \times M/100$$

In the formula above, Ith represents "current (threshold current) starting laser oscillation in the laser diode 60".

As the method for detecting the touch down, there is no particular restriction, but a conventionally-known method can be applied. For example, a method for detecting torque upon touch down by a sensor provided at the front end portion of the suspension 320 and the like, and a method for detecting elastic wave upon touch down by an AE sensor and the like, can be applied as the method for detecting the touch down.

Then, when the touch down is detected, the heater power HTP supplied to the heater part HT is stored as touch down power $WTDP_1$ (S104).

A series of steps in S103 and S104 above are conducted by supplying the 2nd and 3rd drive current for flying height setting $LDI_2$ and $LDI_3$ (60% and 70% of the drive currents of the tentative optimum drive current $LDI_0$ determined in S101) to the laser diode 60, respectively. Then, correlation between the touch down power WTDP stored in S104 and the drive current for flying height settings LDI is obtained (S105). For example, as shown in FIG. 8, a graph where the touch down power (WTDP) is plotted on the ordinate and the drive currents for flying height setting (LDI) are plotted on the abscissa is created.

From the correlation obtained as mentioned above, tentative optimum heater power $HTP_0$, which is heater power HTP corresponding to the tentative optimum drive current $LDI_0$ determined in S101, and where the flying height of the thermally-assisted magnetic recording head 1 is a target flying height (for example, 2 nm), is obtained (S106).

Figure 8:
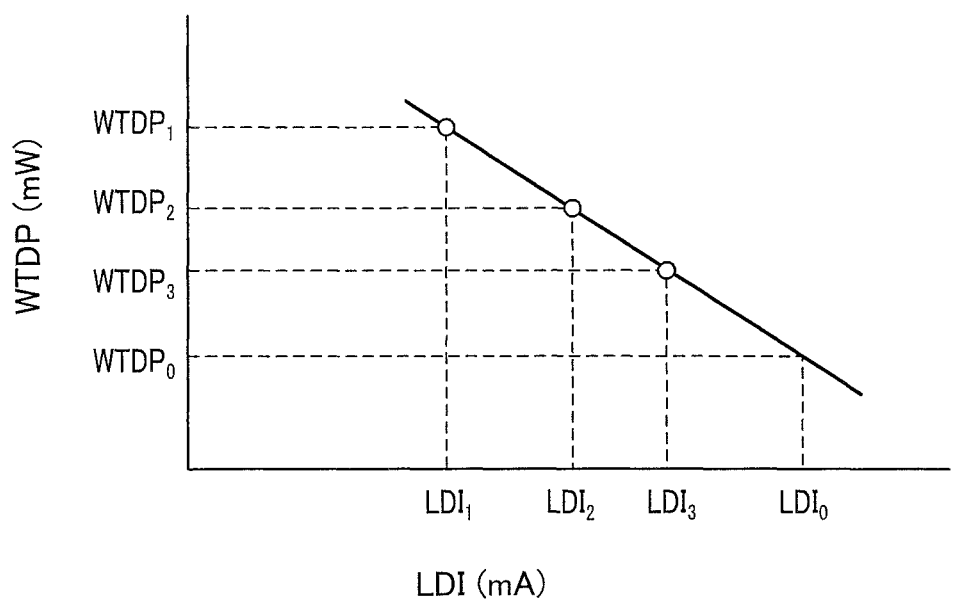
FIG. 8 is a graph showing correlation between a drive current LDI for setting flying height and touch down power WTDP, which are obtained in one embodiment of the present invention.

As shown in FIG. 8, touch down power $WTDP_0$ corresponding to the tentative optimum drive current $LDI_0$ determined in S101 can be obtained based upon the correlation above; however, if the touch down power $WTDP_0$ is supplied to the heater part HT and the tentative optimum drive current $LDI_0$ determined in S101 is supplied to the laser diode 60 and near-field light is generated, it is presumed that the head part end surface 12a is touched down due to the protrusion of the head part end surface 12a. Then, a relationship of change volume of the protrusion amount of the head part end surface 12a relative to the change volume of the heater power HTP that is supplied to the heater part HT is pre-obtained, and the tentative optimum heater power $HTP_0$ where the thermally-assisted magnetic recording head 1 can fly with the target flying height can be obtained from the touch down power $WTDP_0$.

Furthermore, the relationship of the change volume of the protrusion amount of the head part end surface 12a relative to the change volume of the heater power HTP that is supplied to the heater part HT can be obtained when a touch down test is conducted by supplying only the heater power HTP to the heater part HT without supplying a write current $I_W$ and a drive current LDI.

The tentative optimum heater power $HTP_0$ obtained as mentioned above is supplied to the heater part HT, the tentative optimum drive current $LDI_0$ determined in S101 is supplied to the laser diode 60 and a reference signal is recorded in the magnetic disk 301 (S107). Then, the reference signal is reproduced, and it is determined whether or not the signal intensity of the reference signal is within a desired range (S108). For example, according to whether or not SNR of the reference signal is a desired value or greater, it can be determined whether or not the signal intensity of the reference signal is within the desired range.

If the tentative optimum drive current $LDI_0$ determined in S101 is a drive current, which can generate near-field light required for recording to the desired signal in the thermally-assisted magnetic recording head 1, the reference signal should be recorded into the magnetic disk 301 with the desired signal intensity. In the meantime, if the tentative optimum drive current $LDI_0$ determined in S101 is not enough to generate near-field light required for recording the desired signal, the signal intensity of the reference signal is out of the desired range. In other words, whether or not the tentative optimum drive current $LDI_0$ determined in S101 is an optimum drive current $LDI_{OP}$ that can realize characteristics (such as writing characteristic) of the thermally-assisted magnetic recording head 1 can be determined by the signal intensity of the reference signal recorded in S107 above.

In S108 above, when it is determined that the signal intensity of the reference signal is within the desired range (S108, Yes), the tentative optimum drive current $LDI_0$ determined in S101 is determined as the optimum drive current $LDI_{OP}$ that is supplied to the laser diode 60, and the tentative optimum heater power $HTP_0$ determined in S106 is determined as the optimum heater power $HTP_{OP}$ that is supplied to the heater part HT (S109). While the flying height of the thermally-assisted magnetic recording head 1 is set to the target flying height that can respond to the high recording density, a desired signal can be recorded, by supplying the optimum drive current $LDI_{OP}$ determined as mentioned above to the laser diode 60, and by supplying the optimum heater power $HTP_{OP}$ to the heater part HT.

In the meantime, if it is determined that the signal intensity of the reference signal is not within the desired range in S108 above (S108, No), the 4th drive current for flying height setting $LDI_4$ that is greater than the 3rd drive current for flying height setting $LDI_3$ is presumed, for example, as 70% of the current of the optimum drive current $LDI_{OP}$, and then the steps in S103 to S107 are conducted again. In other words, the tentative optimum drive current $LDI_0$ determined in S101 is changed to a greater current value, and the steps in S102 to S107 are conducted again. For example, a current value where a current value for the 3rd drive current for flying height setting $LDI_3$ is divided by 0.9 can be set as a current value for the 4th drive current for flying height setting $LDI_4$.

Then, until it is determined that the signal intensity of the reference signal is within the desired range in S108 (S108, Yes), the tentative optimum drive current $LDI_0$ determined in S101 is changed to a greater current value, and the steps in S102 to S107 are repeated. Thus, the optimum drive current $LDI_{OP}$ and the optimum heater power $HTP_{OP}$ in the thermally-assisted magnetic recording head 1 are obtained.

Thus, according to the flying height setting method relating to the present embodiment, the optimum drive current $LDI_{OP}$ and the optimum heater power $HTP_{OP}$ where the target flying height is accomplishable per thermally-assisted magnetic recording heads 1 individually having processing variation, and that can respond to the demand for the high recording density can be obtained without damaging the thermally-assisted magnetic recording head 1 and the magnetic disk 301.

<Flying Height Setting Device>

Figure 9:
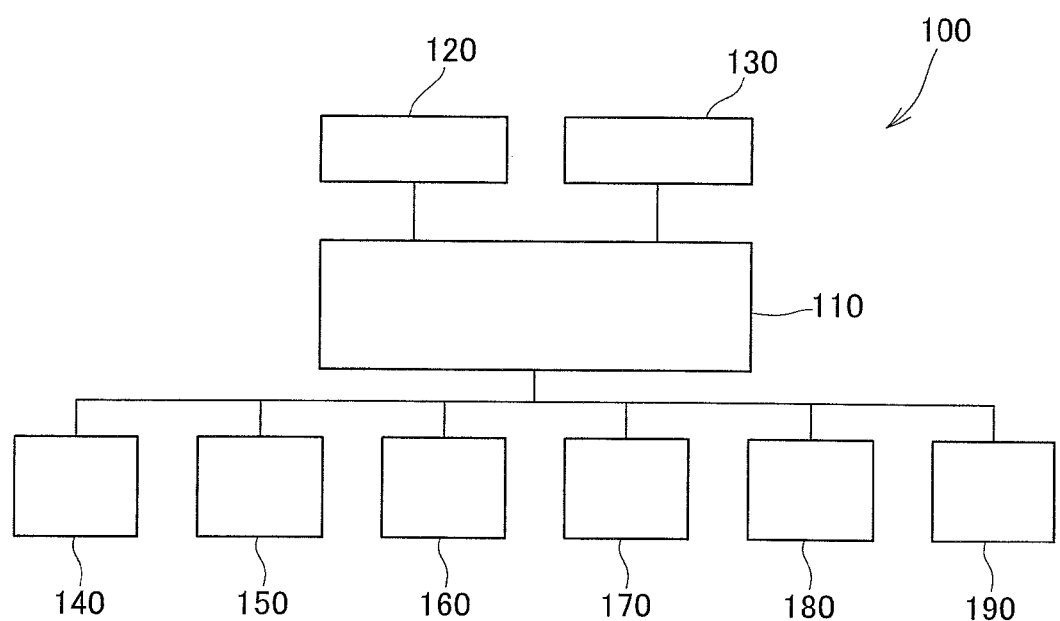
FIG. 9 is a block diagram schematically showing a flying height setting device in one embodiment of the present invention.

Subsequently, a flying height setting device where the flying height setting method can be implemented is explained. FIG. 9 is a block diagram schematically showing the flying height setting device in the present embodiment.

As shown in FIG. 9, the flying height setting device 100 in the present embodiment includes a control part 110, a ROM 120, a RAM 130, a drive current control part 140, a write current control part 150, a heater power control part 160, a VCM control part 170, a SPM control part 180 and a touch down detection part 190.

The control part 110 is connected to the ROM 120, the RAM 130, the drive current control part 140, the write current control part 150, the heater power control part 160, the VCM control part 170, the SPM control part 180 and the touch down detection part 190, and produces a control signal for operating the drive current control part 140, the write current control part 150, the heater power control part 160, the VCM control part 170, the SPM control part 180 and the touch down detection part 190 based on various programs stored in the ROM 120. Further, the control part 110 calculates the drive currents for flying height setting $LDI_1$ to $LDI_n$ (n is an integer of 2 or greater), the touch down power $WTDP_0$ and the tentative optimum heater power $HTP_0$ corresponding to the tentative optimum drive current $LDI_0$, and determines whether or not the SNR of the read reference signal is a predetermined value or greater, based on the various programs stored in the ROM 120.

The various programs for operation by the control part 110 are stored in the ROM 120. For example, a program for producing a control signal for determining magnitude of the drive currents (such as the tentative optimum drive current $LDI_0$, the drive currents for flying height setting $LDI_1$ to $LDI_n$ (n is an integer of 2 or greater) or the optimum drive current $LDI_{OP}$) by the drive current control part 140, a control signal for determining magnitude of the write current $I_W$ that is supplied to the writing coil 22e by the write current control part 150, and a control signal for determining heater power (such as the tentative optimum heater power $HTP_0$ or the optimum heater power $HTP_{OP}$) that is supplied to the heater part HT by the heater power control part 160; a program for producing a control signal for determining a drive current that drives the voice coil motor (VCM) by the VCM control part 170; a program for producing a control signal for determining a drive current that drives the spindle motor (SPM) by the SPM control part 180; a program for storing the heater power upon touch down in the RAM 130 based on the touch down detection signal sent form a touch down detection part 190, and for calculating correlation between the drive currents for flying height setting LDI and the touch down power WTDP; and a program for calculating the tentative optimum heater power $HTP_0$ based on the target flying height stored in the RAM 130 are stored in the ROM 120.

The drive current control part 140 is connected to the laser diode 60; determines magnitude of the drive currents (such as the tentative optimum drive current $LDI_0$, the drive currents for flying height setting $LDI_1$ to $LDI_n$ (n is an integer of 2 or greater) or the optimum drive current $LDI_{OP}$) that are supplied to the laser diode 60 based on the control signal(s) from the control part 110; and supplies the drive current(s) to the laser diode 60.

The write current control part 150 is connected to the writing coil 22e; determines magnitude of the write current $I_W$ that is supplied to the writing coil 22e based on the control signal(s) from the control part 110; and supplies the write current $I_W$ to the writing coil 22e.

The heater power control part 160 is connected to the heater part HT; determines heater power (such as tentative optimum heater power $HTP_0$ or the optimum heater power $HTP_{OP}$) that is supplied to the heater part HT based on the control signal(s) from the control part 110; and supplies the heater power to the heater part HT.

The VCM control part 170 and the SPM control part 180 are connected to VCM and SPM, and supply a drive current to VCM and SPM based upon the control signal(s) from the control part 110, respectively.

The touch downdetection part 190 is connected to a sensor included in the front end portion of the suspension 320 or the slider 10; detects contact (touch down) between the thermally-assisted magnetic recording head 1 and the magnetic disk 301; and sends a touch down detection signal to the control part 110.

In a flying height setting device 100 having the configuration above, when the tentative optimum drive current $LDI_0$ is entered by a user via an input device (not shown), the tentative optimum drive current $LDI_0$ is stored in the RAM 130, and the 1st to 3rd drive currents for flying height setting $LDI_1$ to $LDI_3$ are calculated and set, and stored in the RAM 130. Then, a control signal for supplying the 1st drive current for flying height setting $LDI_1$ to the laser diode 60 is sent to the drive current control part 140, and, control signals for supplying the write current $I_W$ and the heater power HTP are sent to the write current control part 150 and the heater power control part 160, respectively.

The drive current control part 140 supplies the 1st drive current for flying height setting $LDI_1$ to the laser diode 60 based on a control signal from the control part 110. The write current control part 150 and the heater power control part 160 supply the write current $I_W$ and the heater power HTP to the writing coil 22e and the heater part HT based on the control signal(s) from the control part 110, respectively.

When the touch down of the thermally-assisted magnetic recording head 1 is detected by the touch downdetection part 190 and the touch down detection signal is sent to the control part 110, the control part 110 relates the heater power (touch down power) upon touch down to the 1st drive current for flying height setting $LDI_1$ and stores them in the RAM 130. Then, the control signal for supplying the 2nd drive current for flying height setting $LDI_2$ is sent to the drive current control part 140, and control signals for supplying the write current $I_W$ and the heater power HTP are sent to the write current control part 150 and the heater power control part 160.

Similarly, when the 2nd drive current for flying height setting $LDI_2$ is supplied to the laser diode 60 and a touch down detection signal is sent to the control part 110 by the touch down detection part 190, the control part 110 stores the heater power (touch down power) upon touch down by relating to the 2nd drive current for flying height setting $LDI_2$, and control signals for supplying the 3rd drive current for flying height setting $LDI_3$, the write current $I_W$ and the heater power HTP are sent to the drive current control part 140, the write current control part 150 and the heater power control part 160, respectively.

Similarly, the 3rd drive current for flying height setting $LDI_3$ is supplied to the laser diode 60, and when the touch down detection signal is sent to the control part 110 by the touch down detection part 190, the control part 110 stores the heater power (touch down power) upon touching down in the RAM 130 by relating to the 3rd drive current for flying height setting $LDI_3$, and calculates correlation between the drive currents for flying height setting and the touch down power. Then, the tentative optimum heater power $HTP_0$ is calculated based on the correlation and the target flying height stored in the RAM 130.

The control part 110 sends control signals for supplying the tentative optimum drive current $LDI_0$ and the tentative optimum heater power $HTP_0$ to the drive current control part 140 and the heater power control part 160, respectively.

Then, when a reference signal is recorded by the thermally-assisted recording head 1, the control part 110 determines whether or not the signal intensity of the reference signal is within a predetermined range, and if it is determined as within the predetermined range, the tentative optimum drive current $LDI_0$ and the tentative optimum heater power $HTP_0$ are determined as the optimum drive current $LDI_{OP}$ and the optimum heater power $HTP_{OP}$, and they are stored in the RAM 130. In the meantime, when the signal intensity of the reference signal is determined not within the predetermined range, the touch down test is repeatedly continued until it is determined that the signal intensity of the reference signal is within the predetermined range while the tentative optimum drive current $LDI_0$ stored in the RAM 130 is changed.

Thus, according to the flying height setting device 100 in the present embodiment, the target flying height is accomplishable per thermally-assisted magnetic recording head 1 individually having processing variation, and the optimum drive current $LDI_{OP}$ and the optimum heater power $HTP_{OP}$ that can respond to the demand of the high recording density can be obtained without damaging the thermally-assisted magnetic recording head 1 and the magnetic disk 301.

The embodiment explained above is described for facilitating the understanding of the present invention, and is not described for limiting the present invention. Therefore, each element disclosed in the present embodiment is an intent including all design changes and equivalents in the technical scope of the present invention, as well.

In the embodiment above, three drive currents for flying height setting: the 1st to 3rd drive currents for flying height setting $LDI_1$ to $LDI_3$ are set in order to calculate the optimum drive current $LDI_{OP}$ and the optimum heater power $HTP_{OP}$, but the present invention shall not be limited to such mode. For example, there can be at least two drive currents for flying height setting.

In the embodiment above, a reference signal is recorded in the magnetic disk 301 included in the thermally-assisted magnetic disk device (see S106 in FIG. 7), but the present invention is not limited to such mode. For example, a separate magnetic disk where a servo signal(s) is recorded may be provided, and the reference signal may be recorded in the magnetic disk. If it is designed such that a reference signal is recorded in the separate magnetic disk and the optimum drive current $LDI_{OP}$ and the optimum heater power $HTP_{OP}$ that can accomplish the target flying height are calculated, as a method for evaluating/screening a single unit of the thermally-assisted magnetic recording head 1 using the optimum drive current $LDI_{OP}$ and the optimum heater power $HTP_{OP}$ as indexes, the flying height setting method relating to the present embodiment can be utilized.

In the embodiment above, while a certain write current $I_W$ is supplied to the writing coil 22e, touch down of the thermally-assisted magnetic recording head 1 is conducted, but the present invention shall not be limited to such mode. For example, the touch down of the thermally-assisted magnetic recording head 1 may be conducted without supplying the write current $I_W$ to the writing coil 22e. In this case, considering the protrusion amount of the head part end surface 12a in association with the supply of the write current $I_W$ to the writing coil 22e in advance, the optimum drive current $LDI_{OP}$ and the optimum heater power $HTP_{OP}$ that can accomplish the target flying height can be determined.

In the embodiment above, the thermally-assisted magnetic recording head 1, which is subject for the flying height setting, incorporates one heater part HT within the insulation layer 32a on the element formation surface 11b of the slider substrate 11, but the present invention shall not be limited to such mode. The thermally-assisted magnetic recording head may be one where a plurality of heater parts HT are incorporated within the insulation layer 32a, or may be one where a parallel heater composed of a plurality of heater parts HT in parallel is incorporated within the insulation layer 32a.

In the embodiment above, the thermally-assisted magnetic recording head 1 has one MR element 21, but the present invention shall not be limited to such mode. The thermally-assisted magnetic recording head may have a plurality of MR elements.

Examples

Hereafter, the present invention will be described in detail with reference to examples, but the present invention shall not be limited by the examples below.

Example 1

The thermally-assisted magnetic disk device having a configuration shown in FIGS. 1 to 6 was prepared, and the tentative optimum drive current $LDI_0$ of the laser diode 60 in the thermally-assisted magnetic recording head 1 was determined. The tentative optimum drive current $LDI_0$ was determined to 35 mA, which would be greater than a threshold current Ith (=15.5 mA) to start the laser oscillation in the laser diode 60.

Then, based on the formulae below, the 1st to 3rd drive currents for flying height setting $LDI_1$ to $LDI_3$, which would be 50%, 60% and 70% of the tentative optimum drive current $LDI_0$, were calculated and set.

$$LDI_1=(LDI_0-Ith)\times 0.5+Ith=25.25 \text{ mA}$$

$$LDI_2=(LDI_0-Ith)\times 0.6+Ith=27.20 \text{ mA}$$

$$LDI_3=(LDI_0-Ith)\times 0.7+Ith=29.15 \text{ mA}$$

The 1st to 3rd drive currents for flying height setting $LDI_1$ to $LDI_3$ were supplied to the laser diode 60, respectively; the heater power HTP was supplied to the heater part HT, a write current $I_W$ (=65 mA) was supplied to the writing coil 22e, and while the heater power was gradually increased, the thermally-assisted magnetic recording head 1 was touched down and the touch down was detected. Then, the heater powers HTP (80 mW, 77 mW and 75 mW) supplied to the heater part HT when the touch down was detected were regarded as touch down powers $WTDP_1$ to $WTDP_3$ corresponding to the drive currents for flying height setting $LDI_1$ to $LDI_3$, and correlation between the drive currents for flying height setting and the touch down power WTDP was obtained. The correlation obtained as mentioned above was expressed with the formula (1) below.

$$WTDP_n=-1.28LDI_n+112 (n=1 \text{ to } 3) \quad (1)$$

The touch down power $WTDP_0$ (=67.3 mW) corresponding to the tentative optimum drive current $LDI_0$ was calculated from the formula (1) indicating the correlation above, and the tentative optimum heater power $HTP_0$ (=37.3 mW) where flying height of the thermally-assisted magnetic recording head 1 would become 2 nm was calculated.

Next, the tentative optimum drive current $LDI_0$ (=35 mA) was supplied to the laser diode 60, the calculated tentative optimum heater power $HTP_0$ (=37.3 mW) was supplied to the heater part HT, and a reference signal was recorded in the magnetic disk 301. Then, SNR of a track average signal output (TAA) of the recorded reference signal was obtained, and it was determined whether or not SNR would be 44 dB or greater. Furthermore, in order to record a servo signal in the magnetic disk under predetermined conditions, based on a rule of thumb indicating that it would be necessary to use a thermally-assisted magnetic recording head that can record signals when SNR was 44 dB or greater, an index: "SNR of TAA is 44 dB or greater" was used in the present embodiment.

Since the SNR of the TAA of the reference signal was less than 44 dB, a value where the 3rd drive current for flying height setting $LDI_3$ (=29.15 mA) was divided by 0.9 was regarded as the 4th flying height setting device current $LDI_4$ (=32.39 mA). Then, it was assumed that the 2nd drive current for flying height setting $LDI_2$ (=27.2 mA), the 3rd drive current for flying height setting $LDI_3$ (=29.15 mA) and the 4th drive current for flying height setting $LDI_4$ (=32.39 mA) were 50%, 60% and 70% of current values relative to the tentative optimum drive current $LDI_0$, and a relational expression (LDI=35.7X+6.86) between the drive current for flying height setting LDI and a ratio (X) to the tentative optimum drive current $LDI_0$ was obtained from the 2nd to 4th drive currents for flying height setting $LDI_2$ to $LDI_4$. Then, from the relational expression, the tentative optimum current $LDI_0$ (=42.56 mA) where a ratio to the tentative optimum drive current $LDI_0$ becomes 100% (X=1) was calculated. Correlation between the drive currents for flying height setting LDI and the touch down power WTDP was obtained under conditions of the tentative optimum drive current $LDI_0$ and the 2nd to 4th drive currents for flying height setting $LDI_2$ to $LDI_4$ ($LDI_0$=42.56 mA, $LDI_2$=27.2 mA, $LDI_3$=29.15 mA, $LDI_4$=32.39 mA). The correlation obtained above was expressed with the formula (2) below.

$$WTDP_n=-1.1278LDI_n+105.56 (n=2 \text{ to } 4) \quad (2)$$

The touch down power $WTDP_0$ (=56.8 mW) corresponding to the tentative optimum drive current $LDI_0$ (=42.56 mA) was obtained from the formula (2) indicating the correlation, and the tentative optimum heater power $HTP_0$ (=26.8 mW) where the flying height of the thermally-assisted magnetic recording head 1 becomes 2 nm was calculated.

Next, the tentative optimum drive current $LDI_0$ (=42.56 mA) was supplied to the laser diode 60, the re-calculated tentative optimum heater power $HTP_0$ (=26.8 mW) was supplied to the heater part HT, and a reference signal was recorded in the magnetic disk 301. Then, when SNR of the track average signal output (TAA) of the recorded reference signal was obtained, SNR was 44 dB or greater. According to this, it was determined that the reference signal would be recorded with a desired signal intensity, and the tentative optimum drive current $LDI_0$ (=42.56 mA) and the recalculated tentative optimum heater power $HTP_0$ (=26.8 mW) were determined as the optimum drive current $LDI_{OP}$ and the optimum heater power $HTP_{OP}$ that could accomplish the target flying height (2 nm), respectively.

Experimental Example 1

Measurement of Protrusion Shape Profile of Medium Opposed Surface (Head Part End Surface) in Thermally-Assisted Magnetic Recording Head For the protrusion shape of the head part end surface 12a in the thermally-assisted magnetic recording head 1 in Example 1, a simulation analysis experiment was conducted.

This simulation analysis experiment was conducted using a finite element method.

In the present experimental example, a model where the waveguide 23 in the thermally-assisted magnetic recording head 1, the dielectric layer 32f contacting the side surface 23c of the waveguide 23 and the plasmon-generator 24 were made from TaOx, SiOx and Au, respectively, was adopted.

Further, in the model, width of the magnetic pole 22f in the track width direction (Y-axis direction), width of the waveguide 23 in the track width direction (Y-axis direction), height of the magnetic pole 22f in the Z-axis direction and height of the waveguide 23 in the Z-axis direction were set to 150 μm, 500 nm, 1 μm and 0.5 μm, respectively.

In addition, in the model, height of the first PG part 241 of the plasmon-generator 24 in the Z-axis direction, height of the 2nd PG part 242 in the Z-axis direction, width of the first PG part 241 in the track width direction (Y-axis direction), length of the first PG part 241 in the height direction (X-axis direction), and length of the 2nd PG part 242 in the height direction (X-axis direction) were set to 90 nm, 110 nm, 50 nm, 1 μm and 0.85 μm, respectively.

Then, protrusion shape of the head part end surface 12a of the thermally-assisted magnetic recording head 1 was calculated by simulation analysis. Furthermore, a drive current that is supplied to the laser diode 60 was within the range of 30% to 90% of the optimum drive current $LDI_{OP}$. Further, wavelength $\lambda_L$ of the laser light radiated from the laser diode 60 was set at 800 nm, and the simulation analysis was conducted.

As a result, it was determined that the head part end surface 12a in the thermally-assisted magnetic recording head 1 protruded in precipitous shape by heating in association with generation of a near-field light, in particular because a drive current that is supplied to the laser diode 60 exceeds 70% of the optimum drive current. It is predicted that it becomes difficult to detect touch down because the head part end surface 12a protrudes in the precipitous shape.

According to the results of Experimental example 1, the optimum drive current $LDI_{OP}$ showed excellent correlation with the drive current for flying height setting LDI with 50% to 70% of current value.

According to the result of Experimental example 1, if the drive current for flying height setting LDI with a current value exceeding 70% of the optimum drive current was supplied to the laser diode 60, it was confirmed that the head part end surface 12a of the thermally-assisted magnetic recording head 1 protrudes in the precipitous shape.

According to the results above, it was ascertained that the optimum drive current $LDI_{OP}$ and the optimum heater power $HTP_{OP}$ that can record signals with high recording density can be set under the state where thermally-assisted magnetic recording head 1 stably fries with the flying height even if the flying height is extremely small target flying height, by conducting a touch down test using the drive current for flying height setting LDI, which is 70% or less of the optimum drive current $LDI_{OP}$, preferably 30% to 70%, more preferably 50% to 60%.

The invention claimed is:

1. A method for setting a flying height of a thermally-assisted magnetic recording head relative to a magnetic recording medium in a thermally-assisted magnetic recording device, including
the magnetic recording medium,
the thermally-assisted magnetic recording head, and
a positioning device that supports the thermally-assisted magnetic recording head, and that positions the thermally-assisted magnetic recording head relative to the magnetic recording medium, wherein
the thermally-assisted magnetic recording head includes:
a magnetic pole that generates a writing magnetic field from an end surface that forms a portion of a medium opposed surface facing the magnetic recording medium,
a waveguide where light for exciting surface plasmon propagates,
a plasmon-generator that generates near-field light from a near-field light generating portion on a near-field light generating end surface that forms a portion of the medium opposed surface by coupling with the light in a surface plasmon mode,
a light source part that irradiates the waveguide with light by applying a predetermined drive current, and
a heater part that heats the vicinity of the medium opposed surface in order to protrude the medium opposed surface toward the magnetic recording medium side, wherein the setting method comprising the steps of:
determining a tentative optimum drive current that is supplied to the light source part, and setting 1st to nth drive currents for flying height setting (n being an integer of 2 or more) where values of the drive currents are smaller than the tentative optimum drive current, and increase sequentially;
supplying heater power to the heater part while supplying the 1st to nth drive currents for flying height setting to the light source part to protrude the medium opposed surface of the thermally-assisted magnetic recording head toward the magnetic recording medium side, and detecting touch down of the thermally-assisted magnetic recording head;
storing the heater power that is supplied to the heater part when the touch down of the thermally-assisted magnetic recording head is detected, as touch down power;
calculating a correlation between the 1st to nth drive currents for flying height setting and the touch down power;
determining a tentative optimum heater power to be supplied to the heater part when the tentative optimum drive current is supplied to the light source part so as to set the flying height to be a target flying height,
supplying the tentative optimum drive current to the light source part, supplying the tentative heater power to the heater part, and recording a reference signal to the magnetic recording medium; and
determining whether or not the reference signal is recorded with a desired signal intensity, wherein
when it is determined that the reference signal is not recorded with the desired signal intensity, while current values of the tentative optimum drive current and the 1st to nth drive currents for flying height setting are changed to greater current values, a series of steps from the step of storing the heater power that is supplied to the heater part when the touch down of the thermally-assisted magnetic recording head is detected, as touch down power, to the step of determining whether or not the reference signal is recorded with desired signal intensity, are repeated until the reference signal is recorded with the desired signal intensity, and
when it is determined that the reference signal is recorded with the desired signal intensity, tentative optimum drive current at that time and tentative heater power determined based on the correlation are determined as the optimum drive current to be supplied to the light source part and the optimum heater power to be supplied to the heater part, respectively.

2. The flying height setting method according to claim 1, wherein
all current values of the 1st to nth drive currents for flying height setting are 70% or less of the current value of the tentative optimum drive current.

3. The flying height setting method according to claim 1, wherein
all current values for the 1st to nth drive currents for flying height setting are 60% or less of the current value of the tentative optimum drive current.

4. The flying height setting method according to claim 1, wherein
all current values for the 1st to nth drive currents for flying height setting are included within a range of 30% to 70% of the current value of the tentative optimum drive current.

5. The flying height setting method according to claim 1, wherein
all current values for the 1st to nth drive currents for flying height setting are included within a range of 30% to 60% of the current value of the tentative optimum drive current.

6. The flying height setting method according to claim 1, wherein
the thermally-assisted magnetic head further comprises a writing coil for generating a writing magnetic field in the magnetic pole; and
the step of detecting the touch down is conducted under the state where a write current is supplied to the writing coil.

7. A device for setting a flying height of a thermally-assisted magnetic recording head relative to a magnetic recording medium in a thermally-assisted magnetic recording device, including:
- the magnetic recording medium,
- the thermally-assisted magnetic recording head, and
- a positioning device that supports the thermally-assisted magnetic recording head, and that positions the thermally-assisted magnetic recording head relative to the magnetic recording medium, wherein the thermally-assisted magnetic recording head includes:
- a magnetic pole that generates a writing magnetic field from an end surface that forms a portion of a medium opposed surface facing the magnetic recording medium,
- a waveguide where light for exciting surface plasmon propagates,
- a plasmon-generator that generates near-field light from a near-field light generating portion on a near-field light generating end surface that forms a portion of the medium opposed surface by coupling with the light in a surface plasmon mode,
- a light source part that irradiates the waveguide with light by applying a predetermined drive current, and
- a heater part that heats the vicinity of the medium opposed surface in order to protrude the medium opposed surface toward the magnetic recording medium side, wherein the flying height setting device comprises:
- a drive current determination part that determines a tentative optimum drive current that is supplied to the light source part, and that determines 1st to nth drive currents for flying height setting (n being an integer of 2 or more) where values of the drive currents are smaller than the tentative optimum drive current, and increase sequentially;
- a touch down detection part that detects touch down of the thermally-assisted magnetic recording medium;
- a storage part that stores the heater power, which is supplied to the heater part when the touch down of the of the thermally-assisted magnetic recording head is detected by the touch down detection part;
- a correlation calculation part that calculates a correlation between the 1st to nth drive currents for flying height setting and the touch down power;
- a tentative optimum heater power determination part that determines tentative optimum heater power to be supplied to the heater part when the tentative optimum drive current is supplied to the light source part based on the correlation, so as to set the flying height as a target flying height; and
- a determination part that supplies the tentative optimum drive current to the light source part, and that supplies the optimum heater power to the heater part, and that determines whether or not a reference signal recorded in the magnetic recording medium is recorded with a desired signal intensity.

* * * * *